United States Patent [19]

Shirakawa

[11] Patent Number: 5,682,864

[45] Date of Patent: Nov. 4, 1997

[54] CONTROLLER FOR INTERNAL COMBUSTION ENGINES

[75] Inventor: Takashi Shirakawa, Yokosuka, Japan

[73] Assignee: Nissan Motor Co., Ltd., Kanagawa, Japan

[21] Appl. No.: 688,887

[22] Filed: Jul. 31, 1996

[30] Foreign Application Priority Data

Aug. 1, 1995 [JP] Japan .................................... 7-196735

[51] Int. Cl.$^6$ ................................................ F02M 25/07
[52] U.S. Cl. .......................................... 123/569; 123/571
[58] Field of Search ................................ 123/568, 569, 123/571

[56] References Cited

U.S. PATENT DOCUMENTS

| | | | |
|---|---|---|---|
| 4,428,354 | 1/1984 | Sundeen et al. | 123/571 |
| 4,455,987 | 6/1984 | Sudbeck et al. | 123/569 |
| 4,548,185 | 10/1985 | Pozniak | 123/571 |
| 4,641,624 | 2/1987 | Tsutsumi | 123/571 |
| 4,644,926 | 2/1987 | Sakurai et al. | 123/571 |
| 4,762,107 | 8/1988 | Schoneck et al. | 123/569 |
| 4,782,810 | 11/1988 | Shimoda et al. | 123/571 |
| 5,150,694 | 9/1992 | Currie et al. | 123/571 |
| 5,273,019 | 12/1993 | Matthews et al. | 123/571 |
| 5,377,651 | 1/1995 | Sczomak et al. | 123/571 |
| 5,505,174 | 4/1996 | Komoriya et al. | 123/571 |

FOREIGN PATENT DOCUMENTS

| | | |
|---|---|---|
| 60-192870 | 10/1985 | Japan . |
| 63-129157 | 6/1988 | Japan . |
| 1-219338 | 9/1989 | Japan . |
| 7-253052 | 10/1995 | Japan . |

OTHER PUBLICATIONS

Kihara, Ryoji. "Diesel Passenger Car", pp. 130–141, published by Grand Prix Shuppan Co., Ltd., Nov. 1984.

Primary Examiner—Willis R. Wolfe
Attorney, Agent, or Firm—Lowe, Price, LeBlanc & Becker

[57] ABSTRACT

A controller for an internal combustion engine is constructed such that, when detecting a variation in the operating conditions of the engine or acceleration, a lag of fuel injection timing control is predicted. In accordance with a difference between an actual fuel injection timing and the predicted target fuel injection timing, a target EGR area, i.e. EGR amount or rate is corrected.

12 Claims, 17 Drawing Sheets

CONTROLLER FOR INTERNAL COMBUSTION ENGINES

BACKGROUND OF THE INVENTION

The present invention relates generally to a controller for internal combustion engines and more particularly, to the controller for internal combustion engines provided with exhaust gas recirculation (EGR) devices.

Generally, diesel engines are constructed such that the fuel injection amount supplied to a combustion chamber and the injection timing are controlled by a fuel injection pump driven in synchronism with engine rotation. Specifically, a hydraulic timer arranged in the fuel injection pump is actuated by pressure supplied from a feed pump so as to vary a rotational phase of a face cam with respect to a drive shaft, thus controlling the fuel injection timing. Moreover, a control sleeve is moved by a control lever or an accelerator to control a completion of fuel force feed, thus adjusting the fuel injection amount.

On the other hand, in view of the results of researches revealing that an increase in the degree of freedom of control parameters of the diesel engines such as fuel injection amount, fuel injection timing, and EGR amount or rate largely contributes to a purification of exhaust gas and an improvement of the operation performance, the diesel engines are more and more electronically controlled in recent years.

By way of example, the fuel injection amount is controlled by driving the control sleeve by a rotary solenoid, whereas the fuel injection timing is controlled through a timer position obtained by adjusting pressure within a high pressure chamber of the timer by a duty solenoid (See "Diesel Passenger Car" by Ryoji KIHARA, pp. 130–141, published by Grand Prix Shuppan Co., Ltd. in November 1984).

When carrying out EGR control in the above electronically controlled diesel engines, the EGR control amount is normally determined out of a two-dimensional map of the engine speed and the fuel injection amount calculated by a position of the control sleeve. Likewise, as for the fuel injection timing, a target fuel injection timing is determined out of the two-dimensional map of the engine speed and the fuel injection amount calculated by a position of the control sleeve.

It is noted that the EGR control amount and the target fuel injection timing are generally determined every engine speed and load in considering an influence of the EGR control amount upon the fuel injection timing and vice versa during steady operation of the diesel engine.

The diesel engines always produce a diffuse combustion in the atmosphere having high excess air ratio. The relation of tradeoff so called between nitrogen oxides (NOx) and particulate matter (PM) is known that a decrease in NOx generally results in an increase in the emission amount of PM. It is noted here that PM includes black smoke.

On the other hand, in view of the protection of the environment, a further purification of exhaust gas is required with respect to the conventional diesel engines. One of the researches of purification of exhaust gas reveals that an engine modification or an improvement of the shape of the combustion chamber, fuel injection system and EGR system allows, with the fuel injection timing being appropriately controlled every engine speed and load, an existence of the area with no or less deterioration in terms of PM, i.e. the area with PM decreased, even if the EGR amount or rate is increased with respect to the conventional diesel engines. It will be thus understood that the application of such new knowledge enables a further reduction in NOx and PM with respect to the conventional diesel engines, contributing to the protection of the environment. However, since the area wherein both NOx and PM can be reduced varies with the engine speed and load, the fuel injection timing and the EGR amount need to accurately be controlled in accordance with the operating conditions.

As for during transient operation of the diesel engine, the following requirements are made due to the responsibility of the fuel injection timing control system and EGR control system:

The above hydraulic timer can have a response lag during transient operation to produce a difference between a target fuel injection timing and an actual fuel injection timing. Moreover, the EGR system can have a response lag of EGR control due to a response lag of EGR control parts, a flow lag of EGR gas, etc.

Conventionally, however, the EGR control amount and the target fuel injection timing are determined in considering only an influence of the EGR control amount upon the fuel injection timing and vice versa during steady operation, so that a control error can be produced, during transient operation, between a target value and an actual EGR control amount or fuel injection timing due to the response lag, etc., failing to achieve a sufficient reduction in harmful exhaust components including CO, HC, etc. in addition to NOx and PM.

As for a response lag of the fuel injection timing system and the EGR system, the hydraulic timer having an operation speed which depends upon a pump chamber pressure of the fuel injection pump and operating against a drive reaction force has a greater time constant than that of an EGR valve undergoing only a force of exhaust pressure, such as a diaphragm valve actuated by negative pressure, a direct-operated valve actuated by a stepping motor or the like. Since the responsibility of the pump is proportional to pump chamber pressure which is substantially proportional to an engine speed, this difference becomes remarkable as the engine speed is low. Thus, when carrying out control with a control error considered due to the response lag, etc., such characteristic difference needs to be taken into account.

As for the methods of EGR control during transient operation, when determining acceleration, one of the methods as disclosed, e.g. in JP-A 60-192870 corrects or decreases the EGR amount, whereas another as disclosed, e.g. JP-A 7-253052 cuts the EGR amount. These methods can restrain a PM deterioration during acceleration to a certain extent, while the effect of reducing NOx is decreased due to reduced EGR rate, failing to avoid an increase in NOx. Moreover, these are based upon a technical idea to avoid a PM deterioration by a reduction in the EGR rate, but fail to consider an influence of a response lag of the fuel injection timing, etc., having no technical idea to positively reduce both NOx and PM by making the fuel injection timing appropriate at the high EGR amount or rate as described above.

Further, as for the methods of EGR control and fuel injection timing control combined, one of the methods as disclosed, e.g. in JP-A 63-129157 corrects the EGR amount in accordance with a difference ΔIT between an actual fuel injection timing and a target fuel injection timing during acceleration, whereas another as disclosed, e.g. in JP-A 1-219338 decreases the EGR amount, and advances the fuel injection timing by a predetermined angle, which is then lagged gradually. However, the former method fails to consider the fact that the EGR control system also has a response lag, and shows a characteristic that a value of the difference ΔIT is not so great just after acceleration and becomes maximum after a while (since, during an initial phase of acceleration, the timer has a large time constant due to low engine speed and thus low internal pressure of the pump, and is affected by a dead time). Thus, this causes lagged correction of the EGR amount to have a difficulty of appropriately controlling the EGR amount in accordance with the fuel injection timing, resulting in less effect of reducing the harmful exhaust components.

On the other hand, the latter method principally concerns setting of the EGR amount and a target fuel injection timing during acceleration, but does not contain a logic of correcting the EGR amount in accordance with an actual fuel injection timing. Moreover, due to the fact that advance-angle correction of the fuel injection timing and subsequent lag-angle operation thereof cannot necessarily ensure the most appropriate fuel injection timing, this method cannot control the fuel injection timing and the EGR amount or rate to their appropriate values which vary every moment in accordance with the degree of the engine speed and load.

It is, therefore, an object of the present invention to provide a controller for internal combustion engines which enables appropriate control of the EGR amount or rate in all the operation area including a period of transient operation of the engines.

SUMMARY OF THE INVENTION

According to one aspect of the present invention, there is provided a controller for an internal combustion engine, the engine being provided with an exhaust gas recirculation (EGR) passage for ensuring communication of an intake passage with an exhaust passage, the controller comprising:

an EGR valve arranged in the EGR passage, said EGR valve serving to control an EGR rate;

means for controlling said EGR valve to obtain a target EGR rate;

means for controlling a fuel injection timing in accordance with operating conditions of the engine;

means for detecting a variation in said operating conditions of the engine;

first means for predicting a lag of said fuel injection timing controlled in accordance with said variation in said operating conditions of the engine detected; and first means for correcting said target EGR rate in accordance with said lag of said fuel injection timing predicted.

Another aspect of the present invention lies in providing, in an internal combustion engine provided with intake and exhaust passages:

means for defining an exhaust gas recirculation (EGR) passage, said EGR passage defining means serving to ensure communication of the intake passage with the exhaust passage;

an EGR valve arranged in said EGR passage defining means, said EGR Valve serving to control an EGR rate;

means for controlling said EGR valve to obtain a target EGR rate;

means for controlling a fuel injection timing in accordance with operating conditions of the engine;

means for detecting a variation in said operating conditions of the engine;

first means for predicting a lag of said fuel injection timing controlled in accordance with said variation in said operating conditions of the engine detected; and first means for correcting said target EGR rate in accordance with said lag of said fuel injection timing predicted.

DETAILED DESCRIPTION OF THE INVENTION

Figure 1:
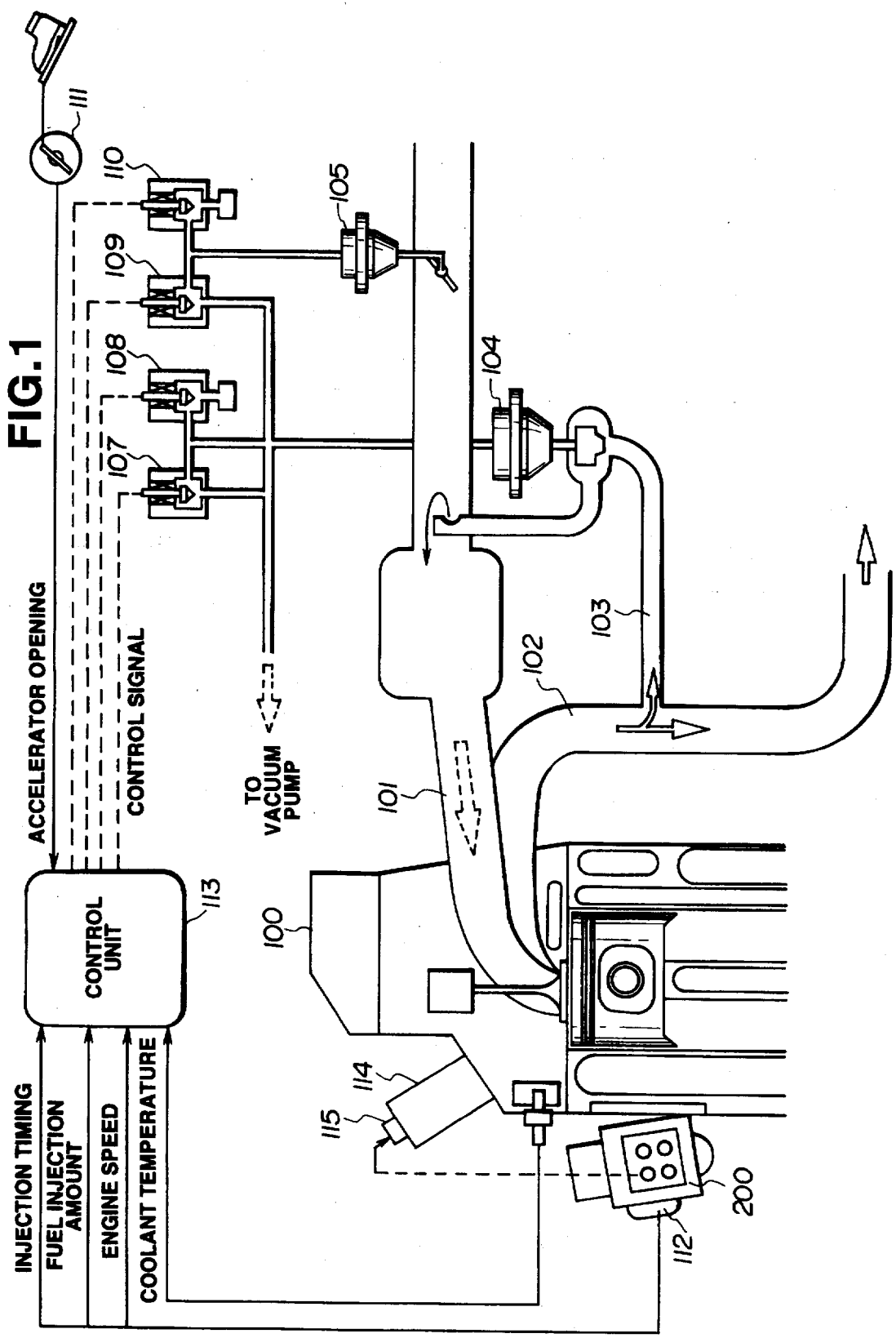
FIG. 1 is a block diagram showing a first preferred embodiment of a controller for internal combustion engines.

Referring to the drawings, preferred embodiments of a controller for internal combustion engines will be described.

Referring first to FIG. 1, connected to a diesel engine, designated generally by reference numeral 100, are an intake passage 101 for conducting intake air to a combustion chamber and an exhaust passage 102 for discharging exhaust gas. An exhaust gas recirculation (EGR) passage 103 is arranged to ensure communication of the intake passage 101 with the exhaust passage 103 so as to recirculate a part of exhaust gas to an engine intake system.

An EGR valve 104 is arranged in the EGR passage 103 to adjust the EGR amount. In order to obtain a desired EGR amount even in the area with small negative pressure of intake air corresponding, e.g. to during low load, etc., an intake throttle valve 105 is arranged in the intake passage 101 to forcedly control the magnitude of negative pressure therein.

Solenoid valves 107, 108 are arranged to control negative pressure for driving the EGR valve 104, whereas solenoid valves 109, 110 are arranged to control the magnitude of negative pressure for driving the intake throttle valve 105.

The solenoid valves 107–110 are driven in response to drive or on-off signals out of a control unit 113, by which negative pressures operating on the EGR valve 104 and the intake throttle valve 105 are switched stepwise to control stepwise the opening degrees of the EGR valve 104 and the intake throttle valve 105, obtaining a desired EGR amount or EGR rate (EGR amount/intake air amount) in accordance with the operation area of the engine, i.e. engine speed and load, coolant temperature, etc.

The control unit 113 is in the form of a microcomputer including CPU, ROM, RAM, A/D converter, I/O interface, etc., and serves as EGR valve controlling means, fuel injection timing controlling means, variation detecting means, first lag predicting means, first target EGR rate correcting means, and second target EGR rate correcting means in the present invention.

Moreover, arranged to the engine 100 are a fuel injection valve 114 which is opened by a predetermined pressure to inject fuel, and a needle-valve lift sensor 115 which detects the lift or open condition of a needle valve of the fuel injection valve 114 to detect an actual fuel injection timing. The needle-valve lift sensor 115 may be a gap sensor so called, etc. A signal derived from the needle-valve lift sensor 115 is input to the control unit 113.

Moreover, there are arranged an engine speed sensor 112 for detecting an engine speed Ne and a control lever sensor 111 for detecting an accelerator opening degree C/L, signals derived therefrom being also input to the control unit 113.

Figure 2:
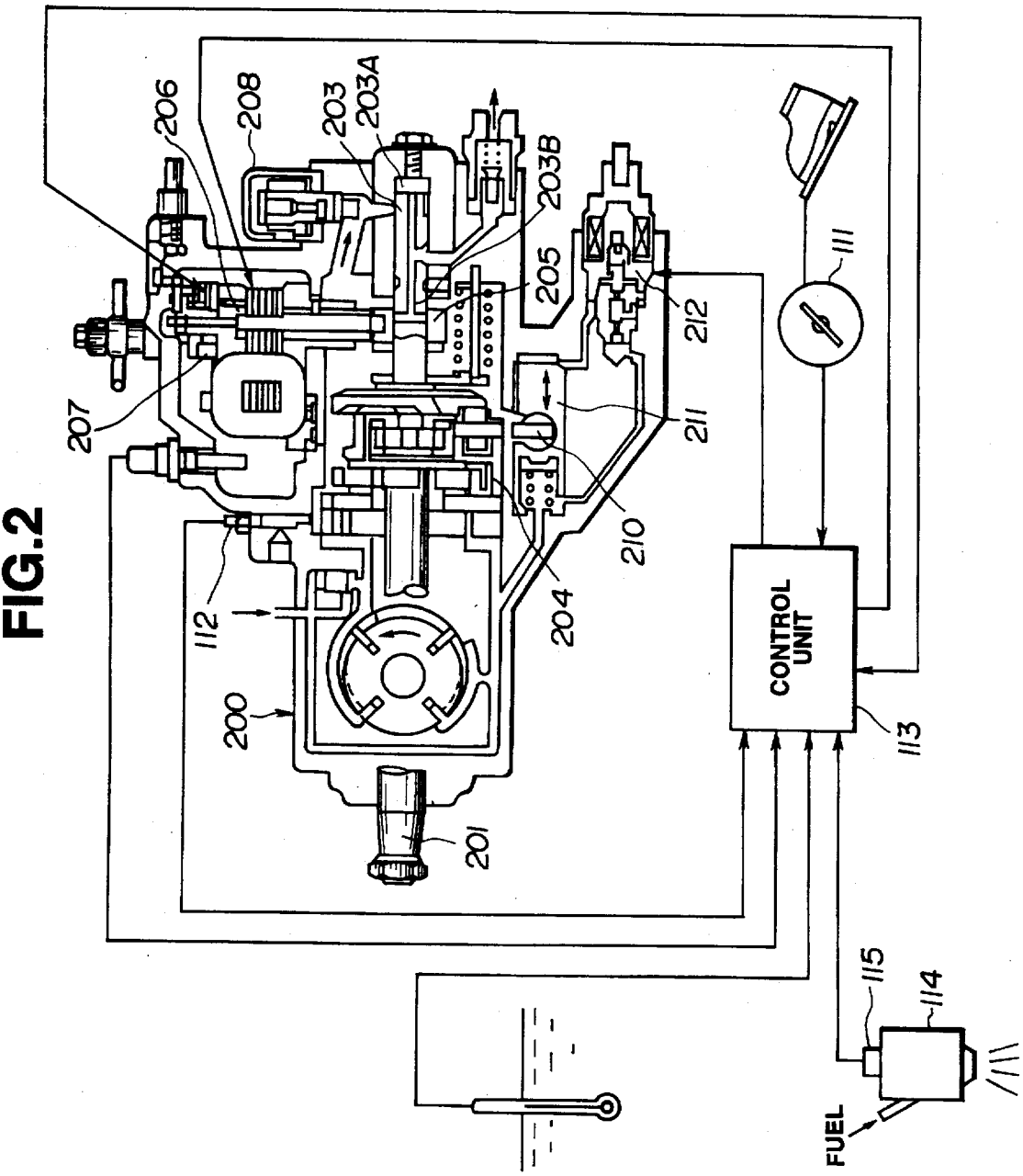
FIG. 2 is a view similar to FIG. 1, showing a fuel injection pump controlled by a control unit.

Referring to FIG. 2, in the first embodiment, an electronically controlled distributor-type fuel injection pump 200 serves as a fuel injection pump for supplying fuel to the fuel injection valve 114 of the engine 100.

In the fuel injection pump 200, control of the fuel injection amount is carried out by controlling a rotation angle of a rotary solenoid or governor motor 206 in accordance with a control signal corresponding to a required fuel injection amount and determined by the control unit 113 in response to a signal derived from the control lever sensor 111 by driver's accelerator operation and a signal indicative of the engine speed, etc. so as to move a control sleeve 205 connected to the governor motor 206 by a link mechanism in the transverse direction as viewed in FIG. 2. That is, control of the fuel injection amount is carried out by controlling a position that fuel compressed in a high pressure chamber 203A leaks through a spill port 203B, i.e. a force feed stroke.

A plunger 203 is moved in the transverse direction as viewed in FIG. 2 by a face cam 204 driven by a drive shaft 201 which is rotated in synchronism with engine rotation with a predetermined rotational phase difference with respect to the drive shaft 201 through a timer mechanism.

A rotation angle of the governor motor 206, i.e. a position of the control sleeve 205 is detected by a control sleeve sensor 207, which is input to the control unit 113, enabling detection of an actual fuel injection amount. Thus, a position of the control sleeve 205 can be feedback-controlled so that an actual fuel injection amount coincides with a target fuel injection amount corresponding to the accelerator opening degree.

The fuel injection pump 200 is provided with a fuel stop valve 208 for stopping a fuel supply.

As for fuel injection timing control, the duty ratio of a timing control valve 212 is controlled in response to a command value of the control unit 113 which is previously determined in accordance with the engine speed and load, etc. to control differential pressure before and after a timer piston 211, controlling a position of the timer piston 211. This oscillates a lever 210 to produce a desired rotational phase difference between the timer pin 211 and the face cam 204, obtaining control of the fuel injection timing.

It is noted that the needle-valve lift sensor 115 for detecting an actual fuel injection timing may be replaced with a timer-piston position sensor which detects a position of the timer piston 211 to detect the fuel injection timing.

Figure 3:
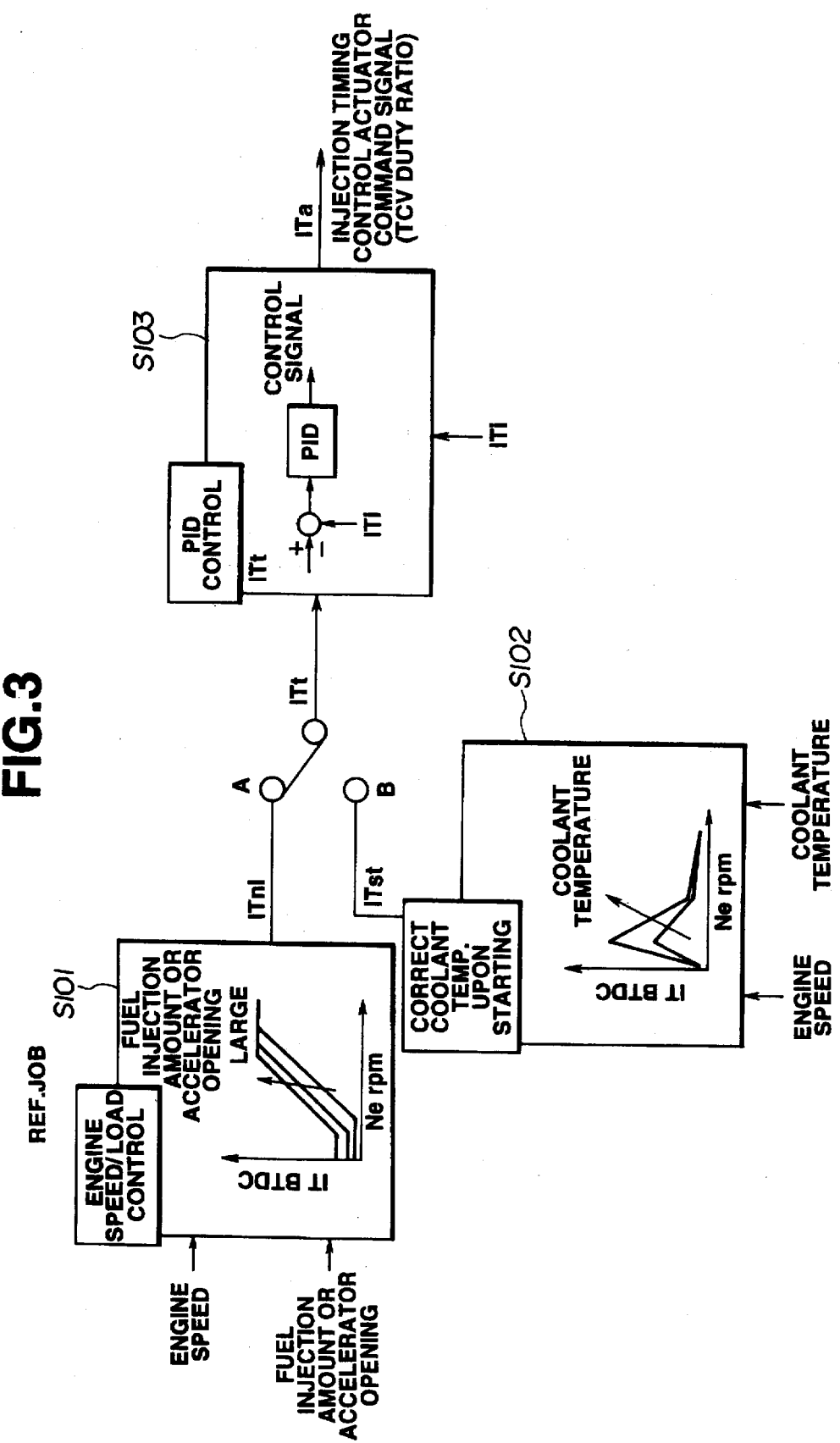
FIG. 3 is a block flow diagram showing fuel injection timing control in the first embodiment.

Referring next to FIG. 3, fuel injection timing control ensured by the control unit 113 will be described. This control is executed every input of a reference (REF) signal.

At a step S101, an engine speed and a load applied to the engine 100, i.e. fuel injection amount or accelerator opening degree are read to obtain a target fuel injection timing ITn1 corresponding to the engine speed and load through a retrieval from a map as shown in FIG. 3, etc.

At a step S102, in order to correct the fuel injection timing upon starting, etc., a target starting fuel injection timing ITst including a correction amount in response to signals indicative of the engine speed and the atmosphere or coolant temperature detected by a temperature sensor, not shown, etc. is obtained through a retrieval from a map as shown in FIG. 3, etc.

Determination whether it is used as a target fuel injection timing ITt the target fuel injection timing ITn1 (determination A) or the target starting fuel injection timing ITst (determination B) can be confirmed, e.g. by determining whether the engine 100 is in starting or in steady operation (determination of the start mode) in accordance with a start signal derived from a key switch, determination of a complete explosion which can be confirmed whether or not the engine speed is greater than a predetermined value, etc.

At a step S103, an actual fuel injection timing ITi detected by the needle-valve lift sensor 115 (or the timer-piston position sensor) is read and compared with the target value ITt, which is computed through proportional plus integral plus derivative (PID) control, etc. so that the actual fuel injection timing ITi corresponds to the target value ITt, outputting a duty command or drive signal ITa to an actuator for fuel injection timing control such as a timing control valve (TCV) 212.

Figure 4:
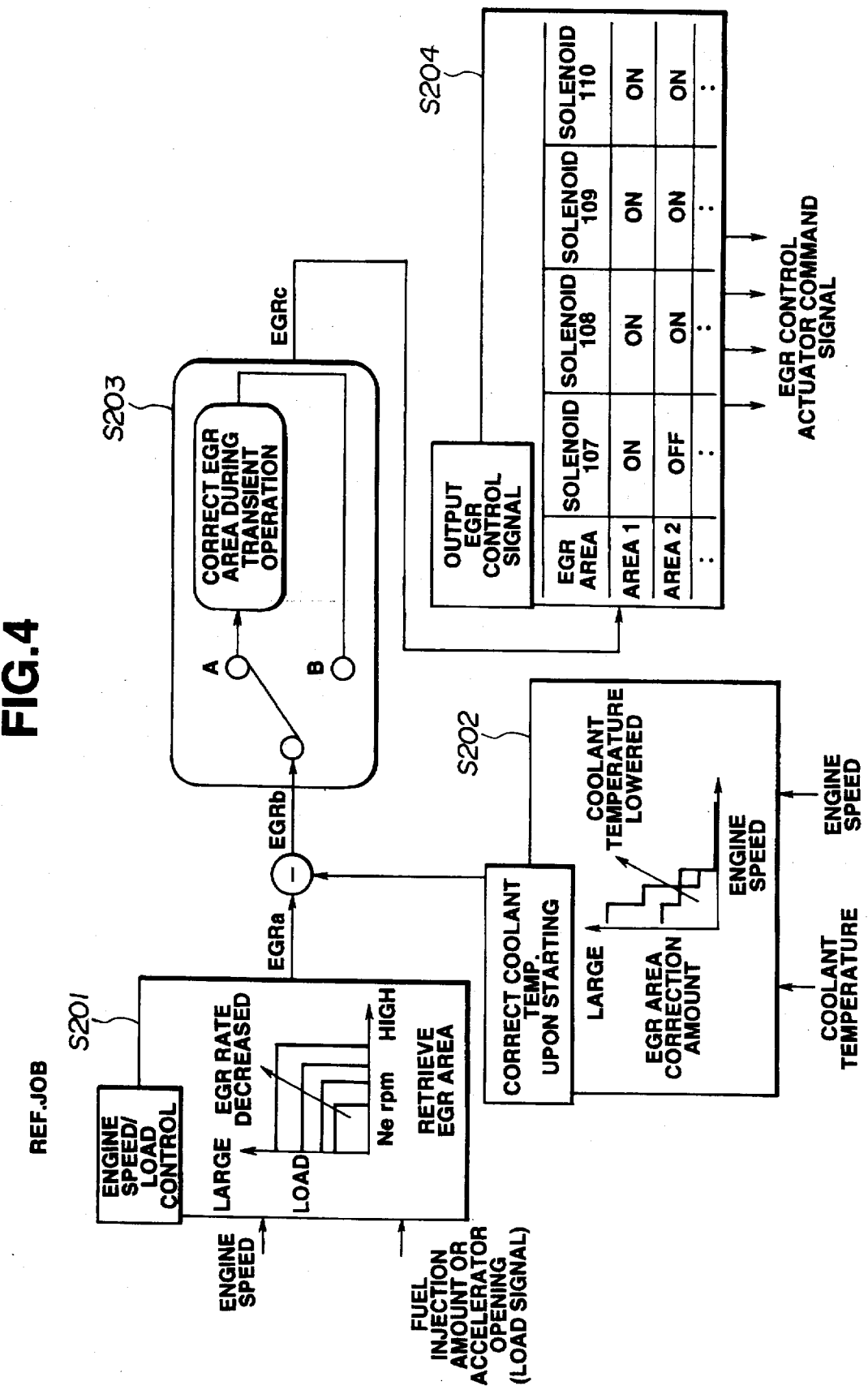
FIG. 4 is a view similar to FIG. 3, showing EGR control in the first embodiment.

Referring to FIG. 4, EGR control ensured by the control unit 113 will be described. This control is also executed every input of a REF signal.

At a step S201, an engine speed and a load applied to the engine 100, i.e. fuel injection amount or accelerator opening degree are read to retrieve a target EGR area EGRa in accordance with the engine speed and load.

At a step S202, a coolant temperature upon starting is corrected. An EGR correction area or amount is obtained from signals indicative of the engine speed and the atmosphere or coolant temperature through a retrieval, which is subtracted from the target EGR area EGRa to obtain a target EGR area EGRb.

At a step S203, it is determined whether the engine 100 is in steady operation or in transient operation. If the engine 100 is in steady operation (determination B), the target EGR area EGRb is output as a final target EGR area EGRc, whereas, if the engine 100 is in transient operation (determination A), the EGR area or amount is corrected, which is output as the final target EGR area EGRc. Details of the step S203 will be given later.

At a step S204, the target EGR area EGRc is put in a whole number, e.g. if 5.236, EGRc is rounded off to 5, or rounded up to 6. The operating or on-off conditions of EGR control parts or solenoid valves 107–110 corresponding to the target EGR area or amount are obtained through a retrieval from a table as shown in FIG. 4 to provide drive signals to the EGR control parts.

Figure 5:
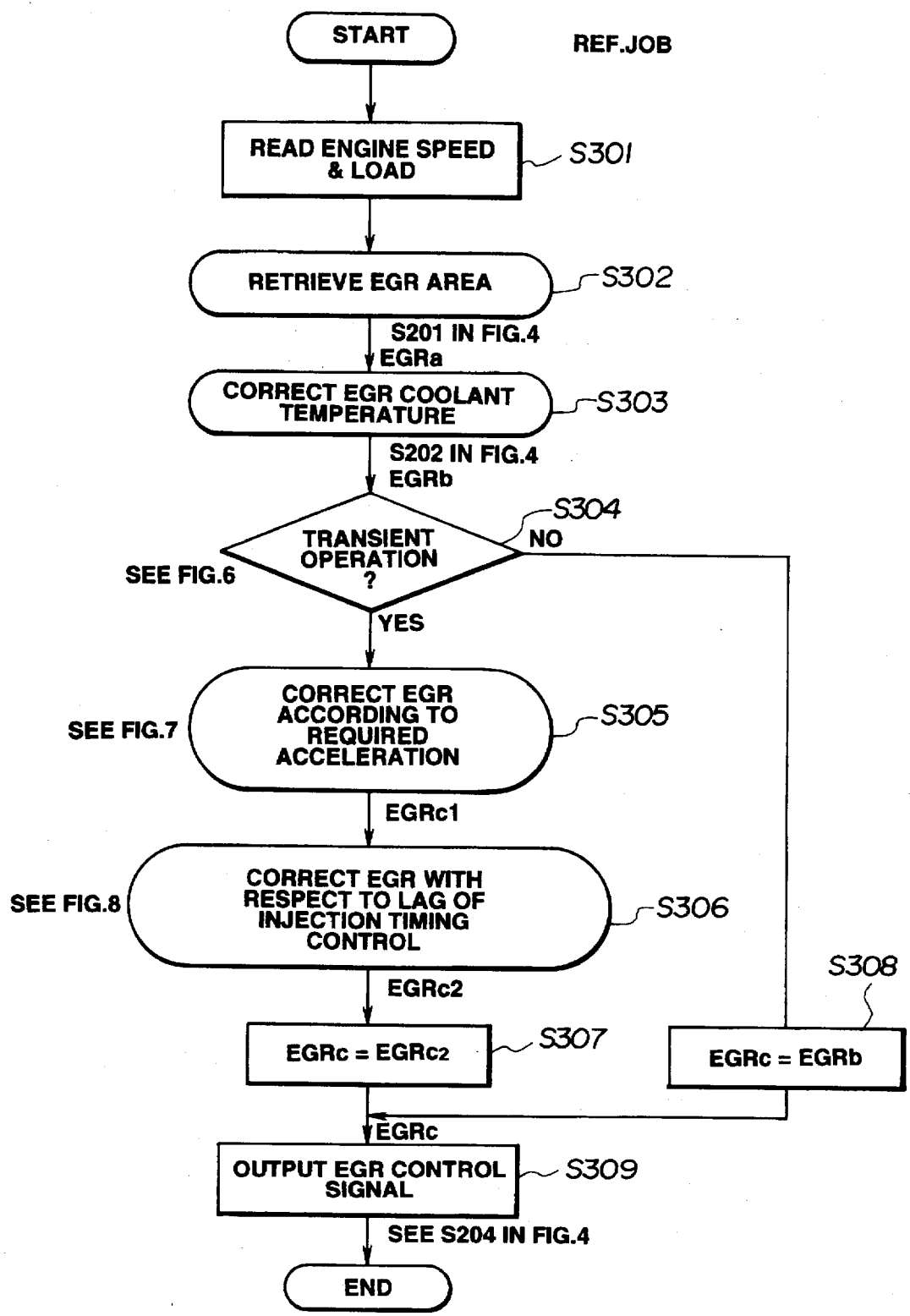
FIG. 5 is a flowchart showing EGR control in the first embodiment.

Referring to FIG. 5, a further detailed description will be made with regard to EGR control ensured by the control unit 113. This flow is started every input of a REF signal.

At a step S301, an engine speed and a load applied to the engine 100, i.e. fuel injection amount or accelerator opening degree are read.

At a step S302, the target EGR area EGRa corresponding to the engine speed and load is retrieved in the same way as described in connection with the step S201 in FIG. 4.

At a step S303, in the same way as described in connection with the step S202 in FIG. 4, the target EGR area EGRa is corrected by the coolant temperature and the engine speed, obtaining the target EGR area EGRb. As for this correction, in view of unstable combustion at low coolant temperature when applying the same EGR at high coolant temperature, the EGR amount is decreased as the atmosphere or coolant temperature is low.

At a step S304, it is determined whether or not the engine 100 is in transient operation. If the answer is YES, control proceeds to a step S305, whereas, if the answer is NO, control proceeds to a step S308. Details of the step S304 will be given later in connection with FIG. 6.

At the step S305, the EGR area or amount is corrected in accordance with driver's required acceleration. Details of the step S305 will be given later in connection with FIG. 7.

At a step S306, a lag of fuel injection timing control is predicted to correct the EGR area or amount. Details of the step S306 will be given later in connection with FIG. 8.

At a step S307, a target EGR area EGRc2 obtained by carrying out transient-operation correction of the EGR area serves as the final target EGR area EGRc.

At a step S308, since the engine 100 is in steady operation, the target EGR area EGRb serves as the final target EGR area EGRc.

At a step S309, in the same way as described in connection with the step S204, the target EGR area EGRc is converted into drive signals to the EGR control parts or the solenoid valves 107–110 corresponding to the EGR area, which are then output to the EGR control parts.

Figure 6:
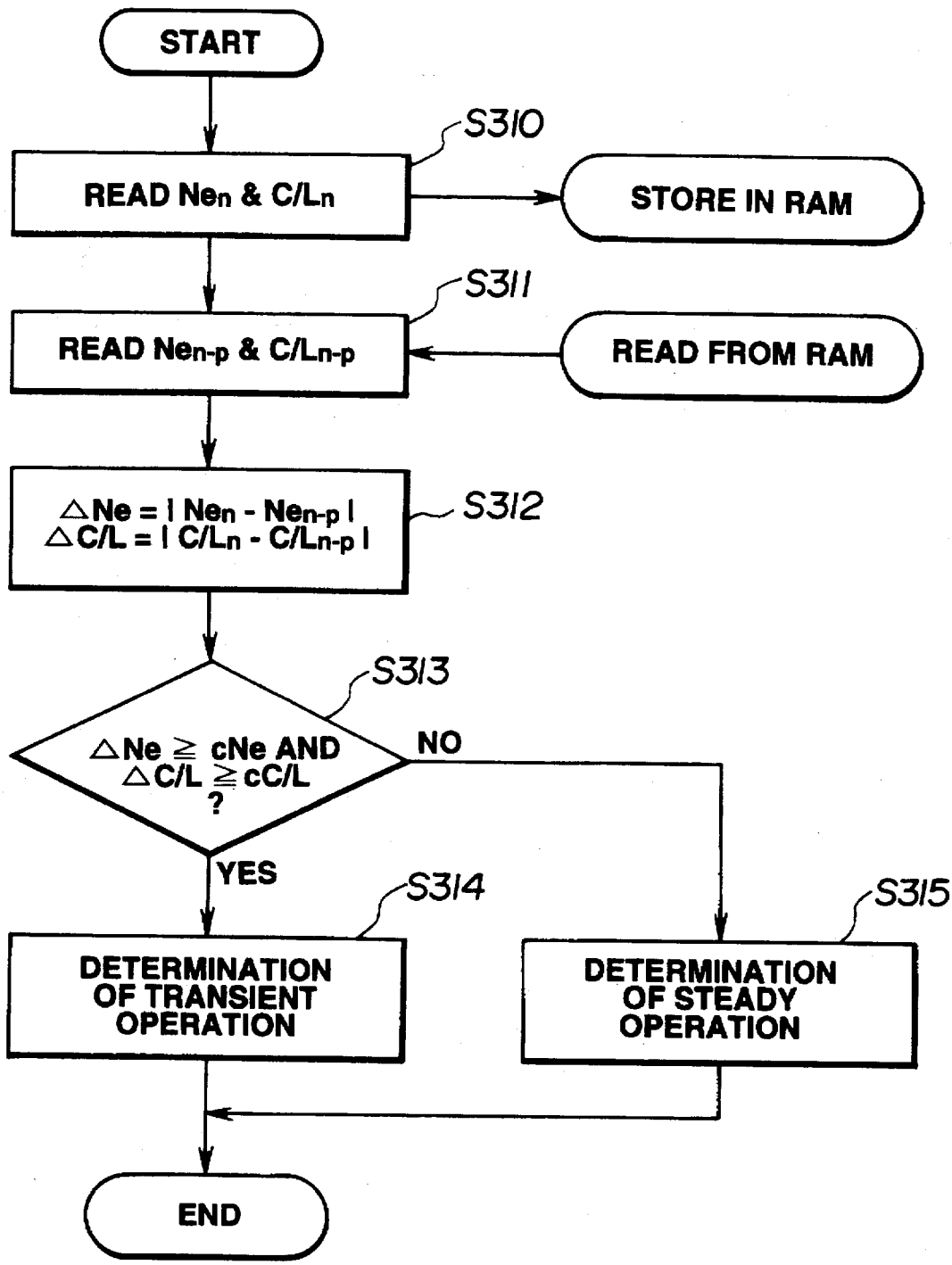
FIG. 6 is a view similar to FIG. 5, showing a routine for transient operation determination in the first embodiment.

Referring to FIG. 6, a description will be made with regard to an example of a routine for transient operation determination carried out at the step S304 in FIG. 5. This routine corresponds to the variation detecting means in the present invention.

At a step S310, an actual engine speed $Ne_n$ and an accelerator opening degree $C/L_n$ are read and stored in RAM.

At a step S311, an engine speed $Ne_{n-p}$ and an accelerator opening degree $C/L_{n-p}$ stored p times before are read from RAM. p is a matching constant determined, e.g. experimentally, in accordance with the performance of CPU and the accuracy of transient determination.

At a step S312, a variation $\Delta Ne$ in the engine speed and a variation $\Delta C/L$ in the accelerator opening degree between the respective actual values and values of p times before are calculated.

At a step S313, it is determined whether or not the variation $\Delta Ne$ is greater than a predetermined value cNe, and the variation $\Delta C/L$ is greater than a predetermined value cC/L. If the answer is YES, control proceeds to a step S314, whereas, if the answer is NO, control proceeds to a step S315.

At the step S314, it is determined that the engine 100 is in transient operation, a transient operation flag is turned on.

At the step S315, it is determined that the engine 100 is in steady operation, the transient operation flag is turned off.

Thus, at the step S314 in FIG. 5, determination of the transient operation flag enables determination whether or not the engine 100 is in transient operation.

Figure 7:
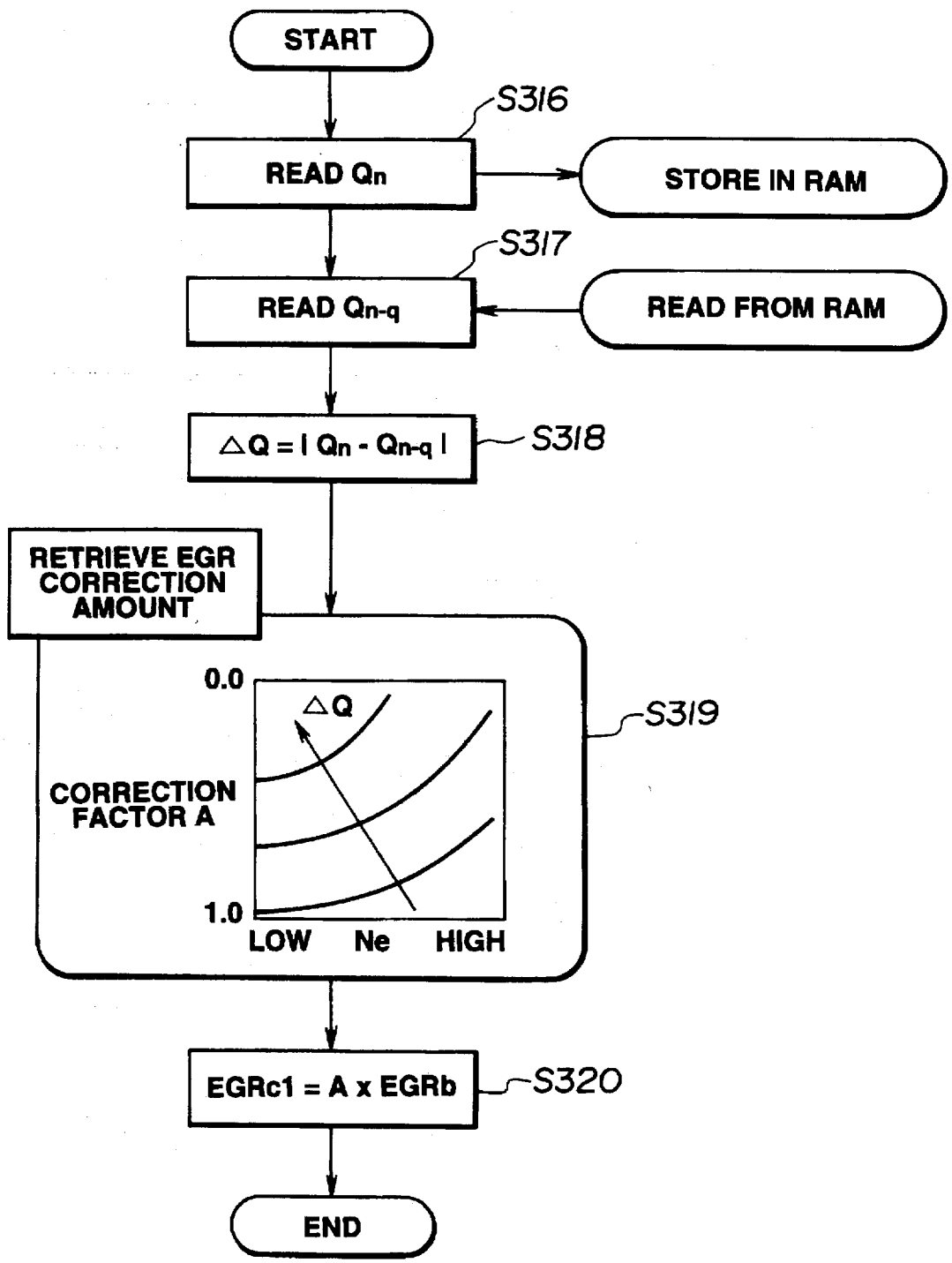
FIG. 7 is a view similar to FIG. 6, showing EGR correction control in accordance with required acceleration in the first embodiment.

Referring to FIG. 7, a description will be made with regard to an example of a routine for EGR correction in accordance with driver's required acceleration carried out at the step S305 in FIG. 5. This routine corresponds to the second target EGR rate correcting means in the present invention.

At a step S316, an actual fuel injection amount Qn is read and stored in RAM. The actual fuel injection amount Qn can be calculated, e.g. through a position of the control sleeve 205.

At a step S317, a fuel injection amount $Q_{n-q}$ stored q times before is read from RAM. q is a matching constant determined, e.g. experimentally, in accordance with the performance of CPU and the accuracy of transient determination.

At a step S318, a variation $\Delta Q$ in the fuel injection amount between the actual value and the value of q times before is calculated.

At a step S319, an EGR correction factor A is obtained through a retrieval from a map as shown in FIG. 7. Specifically, due to the fact that the operation responsibility of drive parts such as the EGR valve 104 and the solenoid valves 107–110 is substantially constant with respect to time irrespective of the engine speed, a lag of an actual EGR amount becomes large as the engine speed is high, i.e. a lag of the engine 100 with respect to a crank rotation angle becomes large as an advance of the crank rotation angle is great in a predetermined period of time, and an excess air ratio is decreased by increased fuel injection amount, EGR control needs to be corrected in accordance with a characteristic in the map.

In place of a retrieval from the map, the EGR correction factor A may be determined by a formula obtained, e.g. experimentally:

$$A = a \cdot Ne^b \cdot \Delta Q^c \qquad (1)$$

where a, b, and c are constants, or $$A = a + b \cdot Ne + c \cdot \Delta Q \qquad (2)$$

where a, b, and c are constants.

At a step S320, the target EGR area EGRb is corrected by using the EGR correction factor A:

$$EGRc1 = A \times EGRb$$

Figure 8:
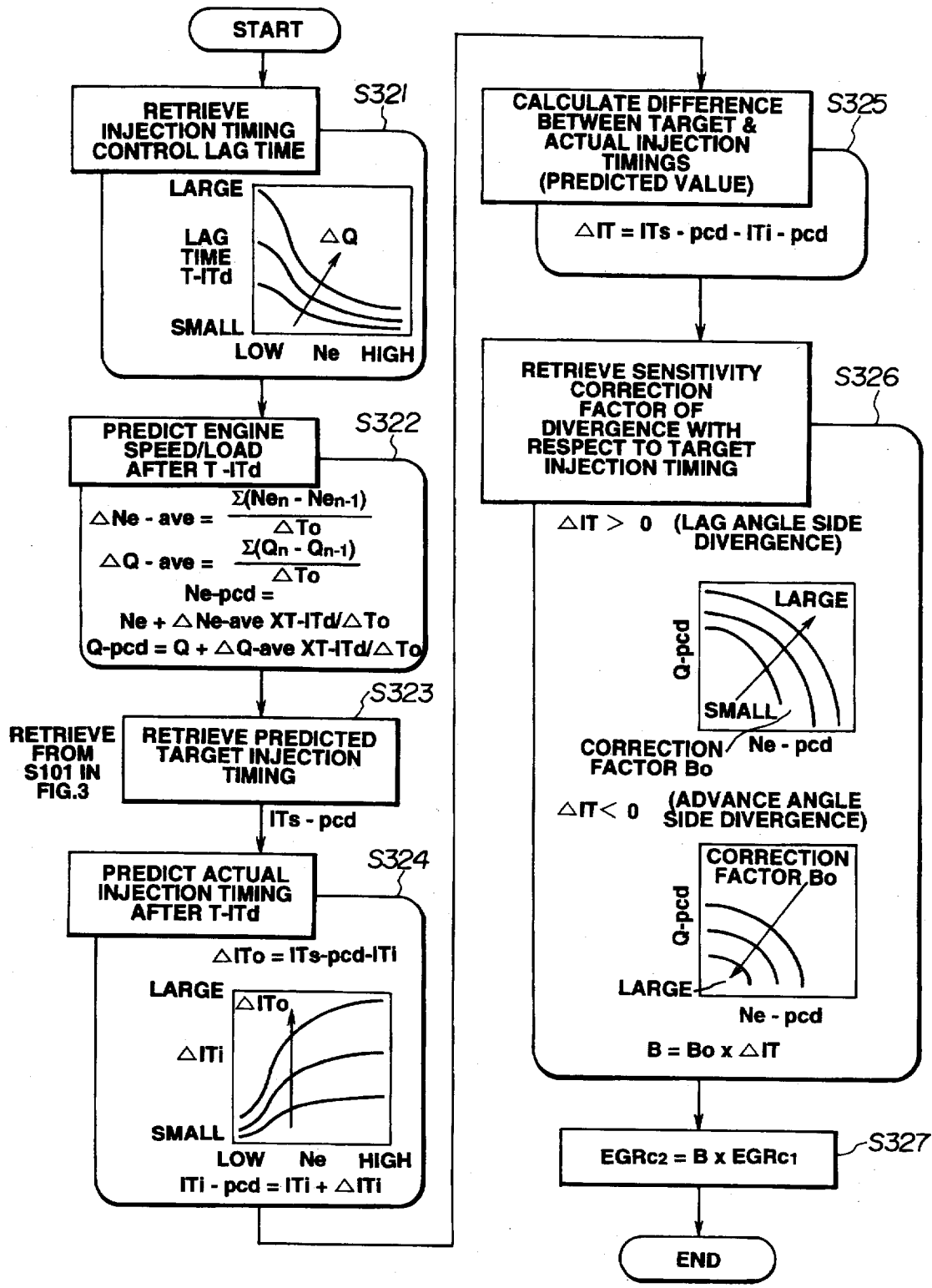
FIG. 8 is a view similar to FIG. 7, showing EGR correction control in accordance with the fuel injection timing in the first embodiment.

Referring to FIG. 8, a description will be made with regard to an example of a routine for EGR correction in accordance with a lag of the fuel injection timing carried out at the step S306 in FIG. 5. This routine corresponds the first lag predicting means and the first target EGR rate correcting means in the present invention.

At a step S321, a lag time T–ITd of fuel injection timing control at the engine speed Ne is obtained from the engine speed Ne and the variation ΔQ calculated at the step 318 in FIG. 7 through a retrieval from a map as shown in FIG. 8. Since the fuel injection timing control system has the aforementioned characteristic with regard to the responsibility of the timer, the lag time T–ITd of fuel injection timing control is given by a characteristic in the map. The lag time T–ITd of fuel injection timing control may correspond to a 95% response at each engine speed, or a time constant upon step response. Moreover, the lag time T–ITd may be obtained by the experimental formula (1) or (2) in place of a retrieval from the map.

At a step S322, an engine speed $Ne_{n\_pcd}$ and a fuel injection amount $Q_{n\_pcd}$ after the time T–ITd are predicted. Specifically, first, an average variation $\Delta Ne_{ave}$ in the engine speed and an average variation $\Delta Q_{ave}$ in the fuel injection amount are calculated during a predetermined little period of time ΔTo, e.g. 100 ms. Then, assuming that each of the engine speed and fuel injection amount after the time T–ITd is approximate to a sum of an actual value and a value obtained by multiplying the corresponding average variation by a period of time (T–ITd)/ΔTo, e.g. in accordance with a corresponding formula in FIG. 8, the engine speed $Ne_{n\_pcd}$ and the fuel injection amount $Q_{n\_pcd}$ are calculated.

At a step S323, a predicted target fuel injection timing $ITs_{pcd}$ corresponding to the engine speed $Ne_{n\_pcd}$ and the fuel injection amount $Q_{n\_pcd}$, i.e. after the time T–ITd, is obtained through a retrieval from the map of the step S101 in FIG. 3.

At a step S324, an actual fuel injection timing $Iti_{pcd}$ after the time T–ITd is predicted. Specifically, first, a difference between the predicted target fuel injection timing $ITs_{pcd}$ and the actual fuel injection timing ITi is obtained to determine a required variation ΔITo in the fuel injection timing. Then, an actually possible variation ΔITi in the fuel injection timing with respect to the difference ΔITo between the actual fuel injection timing and the target value is retrieved at each engine speed. The fuel injection timing control system has the aforementioned characteristic with regard to the responsibility of the timer, the variation ΔITi in the fuel injection timing is given by a characteristic in a map as shown in FIG. 8. The variation ΔITi may be obtained by the experimental formula (1) or (2) in place of a retrieval from the map. Assuming that the actual fuel injection timing $Iti_{pcd}$ after the time T–ITd is a sum of the actual fuel injection timing ITi and the variation ΔITi, the actual fuel injection timing $ITi_{pcd}$ is obtained in accordance with a formula in the map.

At a step S325, a difference ΔIT between the predicted target fuel injection timing $ITs_{pcd}$ after the time T–ITd obtained at the step S323 and the actual fuel injection timing $ITi_{pcd}$ is calculated.

At a step S326, in accordance with determination whether ΔIT>0, or ΔIT<0, an emission sensitivity Bo of the fuel injection timing at the engine speed and load after the time T–ITd is retrieved from a map as shown in FIG. 8. The reason why the two maps are used to make differ the emission sensitivity for a lag angle side divergence of the fuel injection timing from that one for an advance angle side divergence thereof is that, as described above, even with the same amount of divergence with respect to the target value, an influence thereof upon emission or discharge of harmful exhaust components is varied with the engine speed and load. The emission sensitivity Bo is multiplied by the divergence ΔIT with respect to the target fuel injection timing to obtain an EGR correction factor B.

At a step S327, the target EGR area is calculated by the following formula, and control comes to an end:

$$EGRc2 = B \times EGRc1$$

Figure 9:
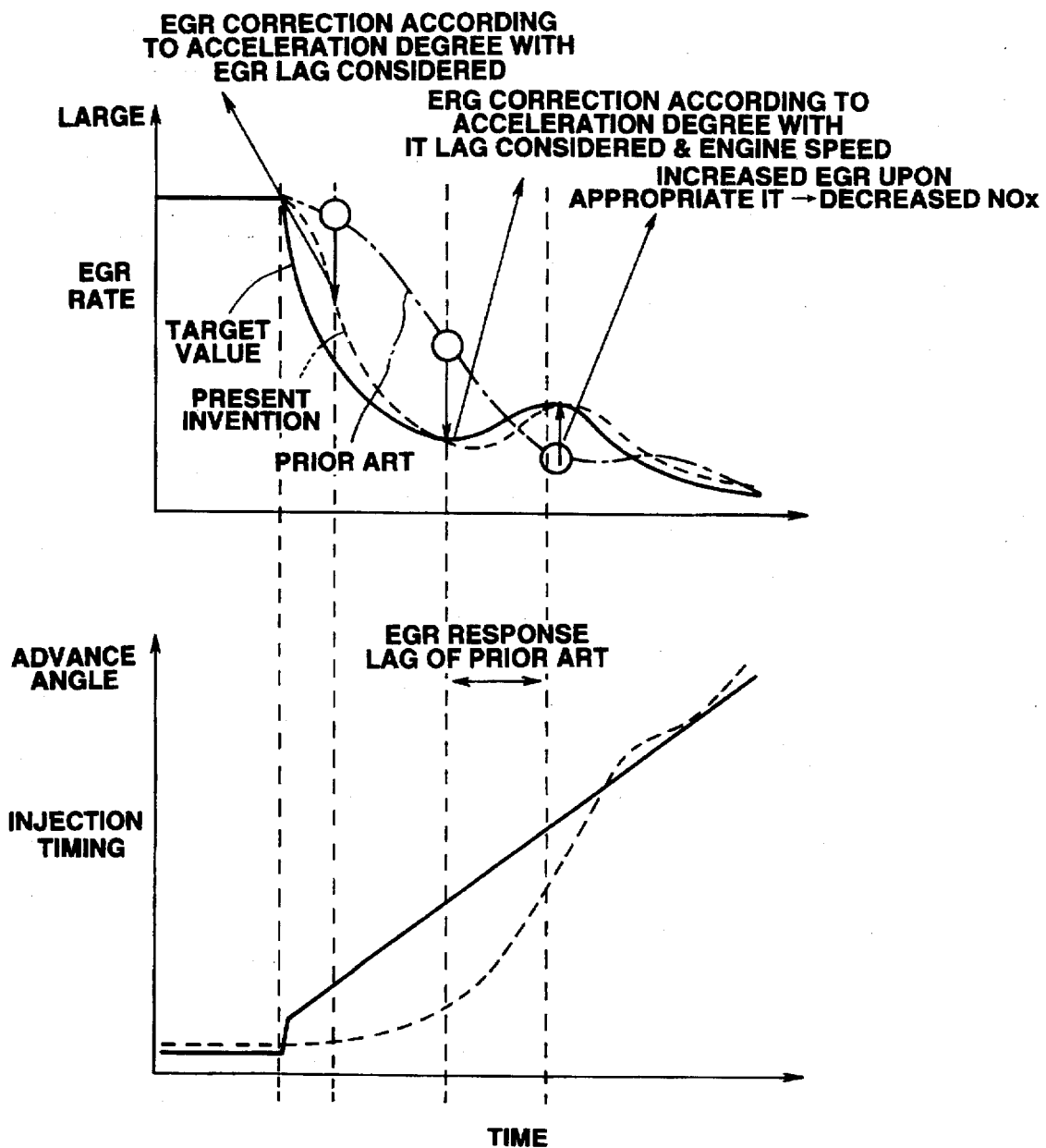
FIG. 9 is a time chart showing an effect of the present invention.
Figure 10:
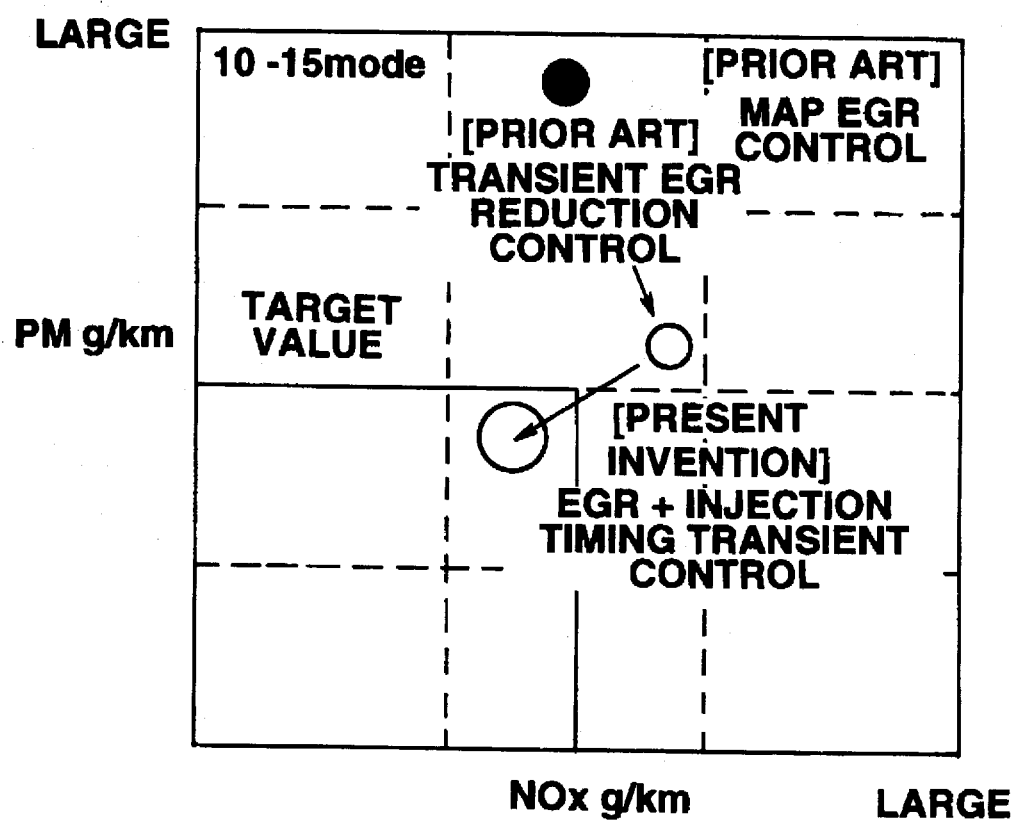
FIG. 10 is a graph illustrating the correlation between NOx and PM.

Referring to FIGS. 9 and 10, according to the first embodiment, when detecting acceleration, the EGR area, i.e. EGR amount or rate is corrected in accordance with the degree of acceleration, whereas the lag T–ITd of fuel injection timing control is predicted. In accordance with the difference ΔIT between the actual fuel injection timing $ITi_{pcd}$ and the predicted target fuel injection timing $ITs_{pcd}$, the target EGR area, i.e. EGR amount or rate is also corrected. Thus, even during transient operation, appropriate EGR control is obtained, i.e. at low engine speed wherein the fuel injection timing is apt to be lagged, the EGR amount or rate is promptly reduced to restrain a PM deterioration, whereas, when the actual fuel injection timing corresponds to the target value, reduction control of the EGR amount is promptly released. Therefore, in all the operation area, accurate EGR control can be ensured with lags of fuel injection timing control and EGR control considered. By way of example, a bench test enables appropriate EGR control with predetermined fuel injection timing and EGR amount or rate which allow consistence of NOx with PM, resulting in possible reduction in NOx with minimum PM deterioration or reduced PM.

Figure 11:
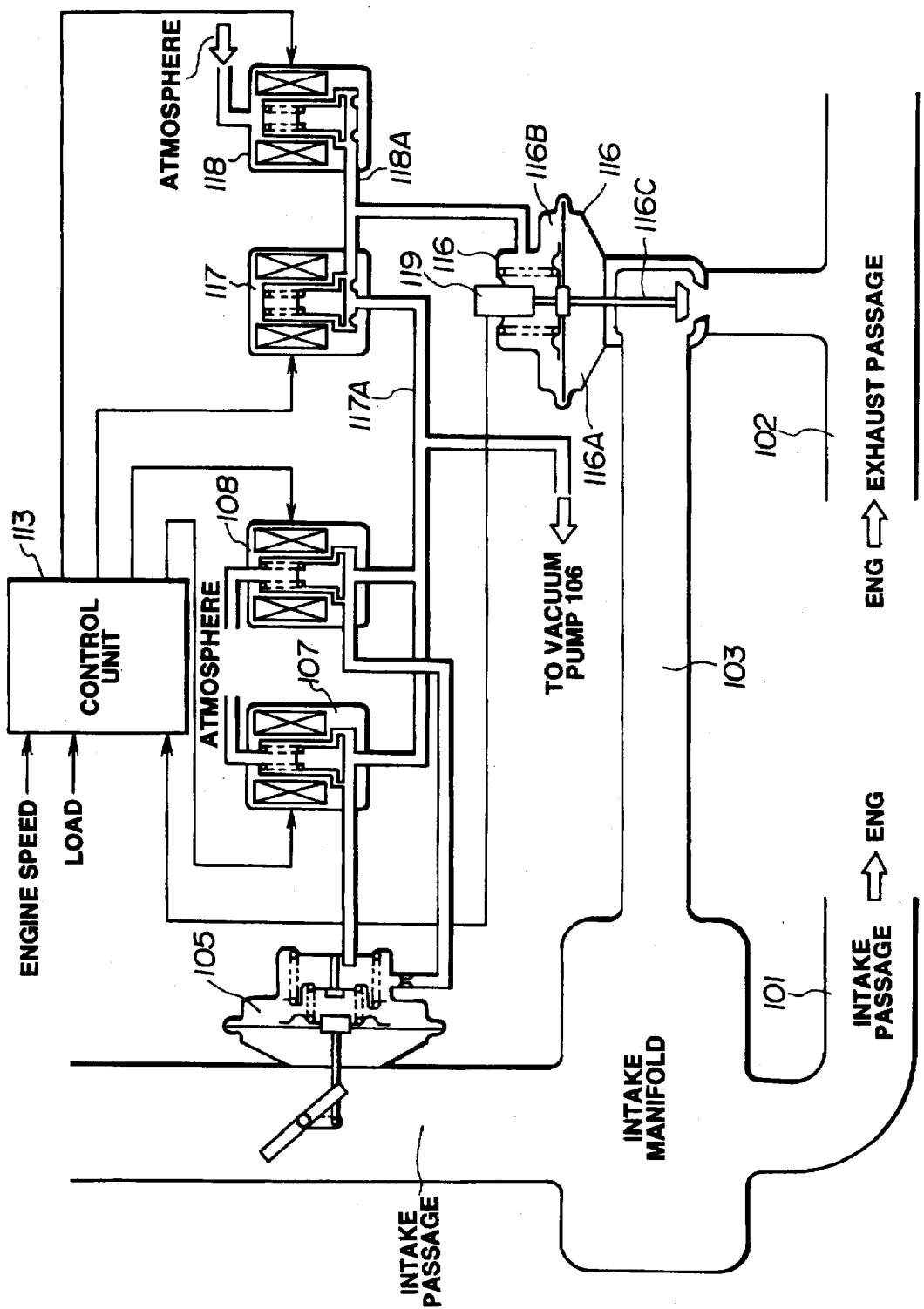
FIG. 11 is a view similar to FIG. 2, showing a second preferred embodiment of the present invention.
Figure 12:
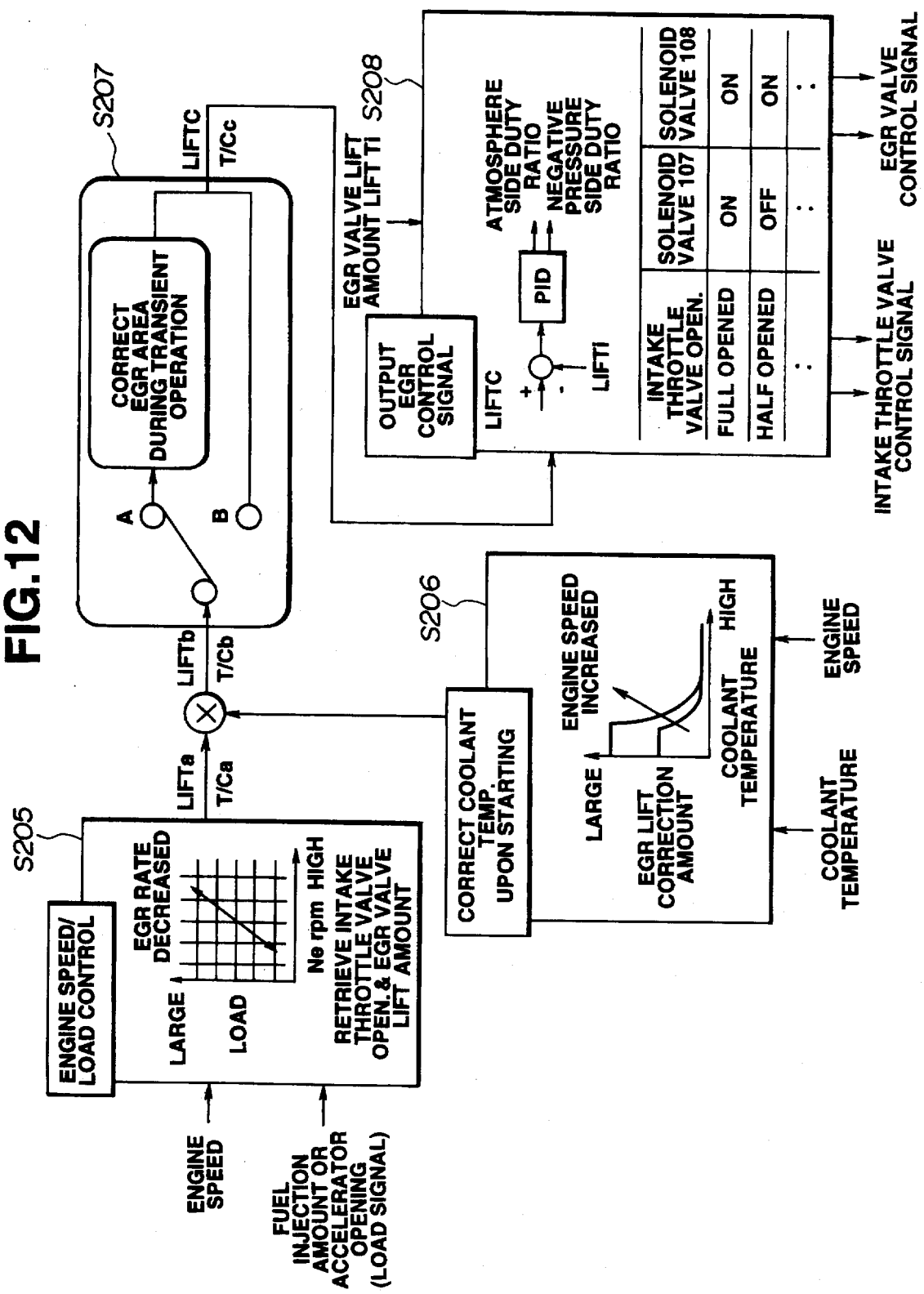
FIG. 12 is a view similar to FIG. 4, showing EGR control in the second embodiment.

Referring to FIGS. 11 and 12, a second embodiment of the present invention will be described. The first embodiment concerns stepwise control of the EGR amount or rate by combination of opening and closing of the solenoid valves 107–110, while the second embodiment concerns continuous control of the EGR amount or rate. The fuel supply system will not be described which is similar to that in the first embodiment.

Referring to FIG. 11, the EGR system is provided with an intake passage 101 and an exhaust passage 102 which are connected to each other through an EGR passage 103. An EGR valve 116 is arranged in the EGR passage 103, and is controlled with respect to the opening degree to obtain a desired EGR amount, i.e. EGR rate (EGR amount/intake air amount).

The EGR valve 116 is constructed so that the lift amount of a valve plug 116C can be controlled by the magnitude of negative pressure acting on a diaphragm 116A, i.e. negative pressure within a working chamber 116B. The EGR amount or rate is controlled in accordance with the lift amount of the valve plug 116C.

Control of the lift amount of the valve plug 116C of the EGR valve 116 or the EGR amount, i.e. the magnitude of negative pressure within the working chamber 116B of the EGR valve 116 is carried out by an atmosphere side control solenoid valve 118 arranged in an atmosphere conducting passage 118A having one end which communicates with the atmosphere and another end which communicates with the working chamber 116B of the EGR valve 116, and a negative pressure side control solenoid valve 117 arranged in a negative pressure conducting passage 117A having one end which communicates with a vacuum pump or negative pressure source 106, not shown, and another end which communicates with the working chamber 116B of the EGR valve 116. The atmosphere side control solenoid valve 118 and the negative pressure side control solenoid valve 117 are controlled by a control unit 113 to have a desired opening degree or duty ratio.

An actual lift amount of the valve plug 116C can be detected by a lift sensor 119 arranged to the EGR valve 116.

Thus, during steady operation, for example, in order that the actual lift amount corresponds to a target value, the duty control amount of the control solenoid valves 118, 117 can be feedback-controlled by the control unit 113.

Operation of an intake throttle valve 105 is substantially the same as that one in the first embodiment.

Referring to FIG. 12, EGR control ensured by the control unit 113 will be described.

At a step S205, an engine speed and a load applied to the engine, i.e. fuel injection amount or accelerator opening degree are read to obtain a target lift amount LIFTa of the EGR valve 116 and a target opening degree T/Ca of the intake throttle valve 105 corresponding to the engine speed and load through a retrieval from a map as shown in FIG. 12, etc.

At a step S206, the EGR amount and the coolant temperature in the EGR area upon starting, etc. are corrected. Specifically, the EGR correction amount is obtained from signals indicative of the engine speed and the atmosphere or coolant temperature detected by a temperature sensor, not shown, etc. through a retrieval from a map as shown in FIG. 12, etc., which is subtracted from the target lift amount LIFTa to obtain LIFTb. Likewise, as for the intake throttle valve 105, the EGR correction amount is obtained from a retrieval from the map, etc., which is subtracted from the target opening degree T/Ca of the intake throttle valve 105 to obtain T/Cb.

At a step S207, it is determined whether the engine is in steady operation or in transient operation. If the engine is in steady operation (determination A), the values LIFTb and T/Cb are output as a target lift amount LIFTc of the EGR valve 116 and a target opening degree T/Cc of the intake throttle valve 105.

On the other hand, it the engine is in transient operation (determination B), the lift amount LIFTb of the EGR valve 116 undergoes correction during transient operation, which is then output as the target lift amount LIFTc. Correction of the lift amount of the EGR valve 116 at the step S207 can be carried out in the same way as in the first embodiment (see FIGS. 5–8). It is noted here that EGRc1 and EGRc2 are replaced with LIFTc1 and LIFTc2, respectively. This is due to the fact that the only difference lies in a selection between correction of the EGR area (to be exact, indirect correction of the EGR area to change combination of opening and closing of the solenoid valves and thus correct the EGR amount), and direct correction of the lift amount of the EGR valve to correct the EGR amount, and a substantial content of correction is identical.

Likewise, the opening degree T/Cb of the intake throttle valve 105 undergoes correction during transient operation, which is then output as the target opening degree T/Cc.

At a step S208, an actual lift amount LIFTi of the EGR valve 116 detected by the lift sensor 119 is read and compared with the target value LIFTc, which is computed through PID control, etc. so that the actual lift amount LIFTi corresponds to the target value LIFTc, outputting a duty command or drive signal to the solenoid valves 117, 118. As for control of the intake throttle valve 105, the target opening degree T/Cc of the intake throttle valve 105 is put in a whole number, e.g. if 5.236, T/Cc is rounded off to 5, or rounded up to 6, and the operating conditions of the intake throttle valve 105 corresponding to the target opening degree T/Cc are obtained through a retrieval from a table as shown in FIG. 12 to provide drive or on-off drive signals to the solenoid valves 107, 108.

In such a way, the second embodiment not only produces the same effect as that of the first embodiment, but enables more accurate EGR control with lags of EGR control and fuel injection timing control considered than that in the first embodiment since the use of the EGR valve 116 allows continuous and fine EGR control. By way of example, the second embodiment enables about 10% reduction in discharged harmful exhaust components compared with the first embodiment.

Figure 13:
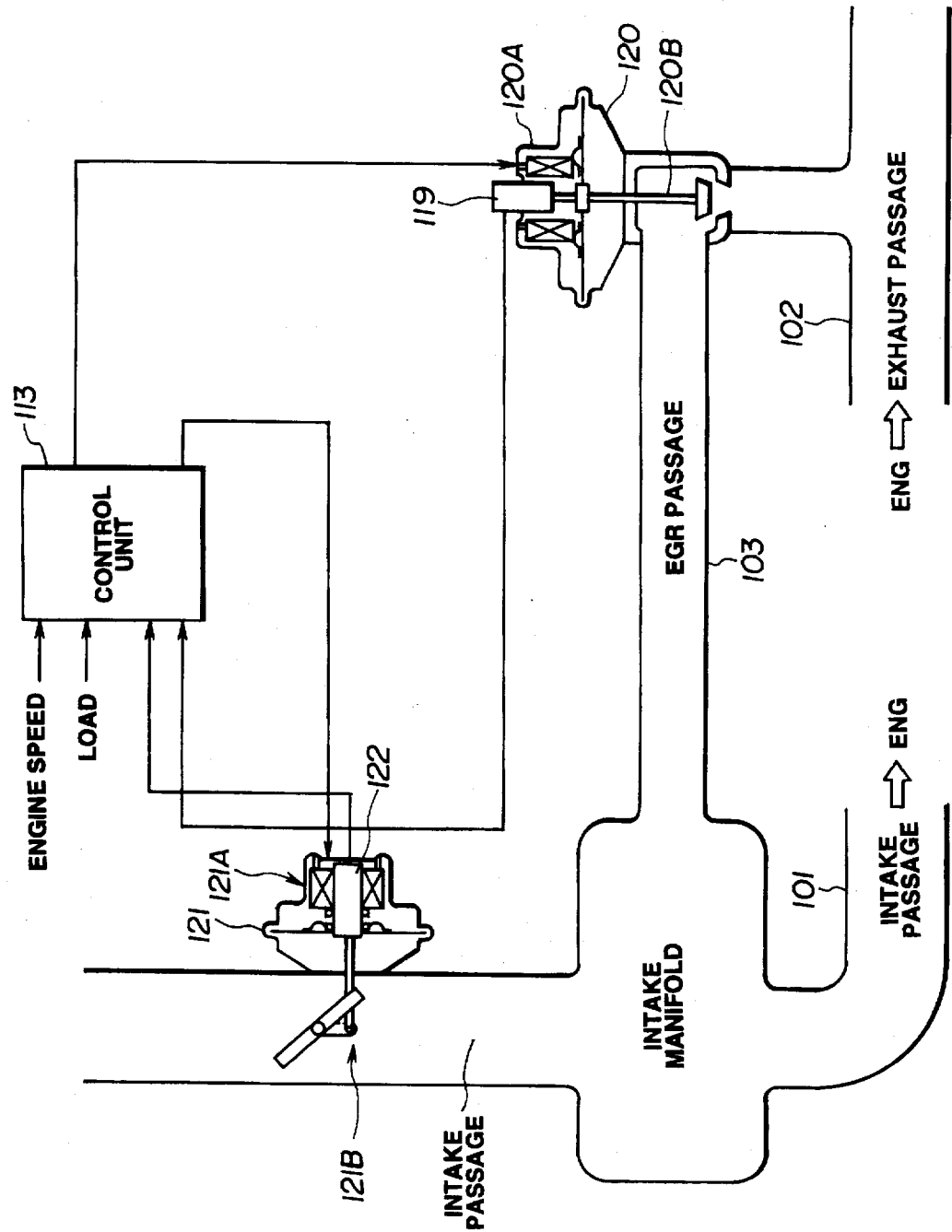
FIG. 13 is a view similar to FIG. 11, showing a third preferred embodiment of the present invention.
Figure 14:
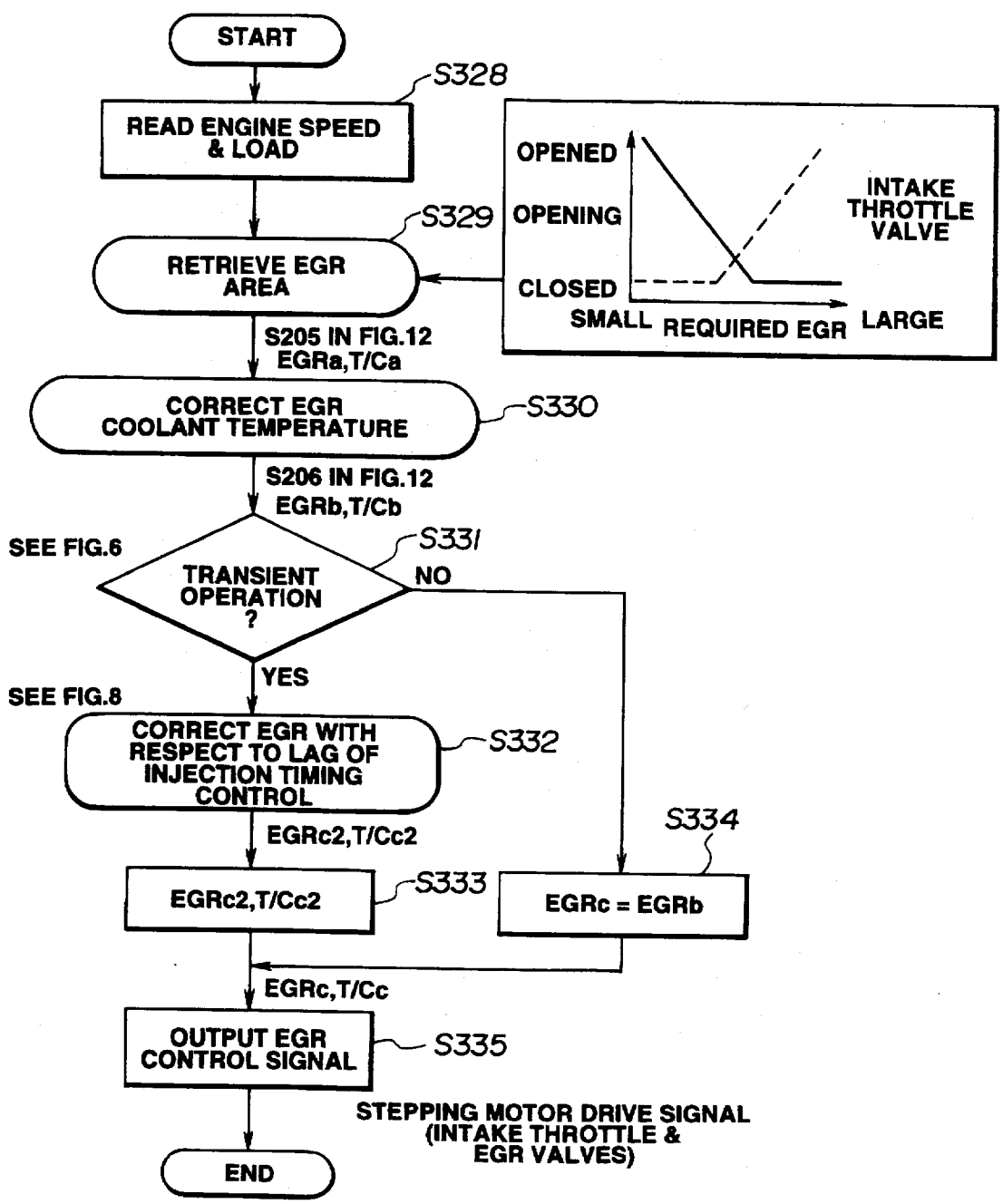
FIG. 14 is a view similar to FIG. 8, showing EGR control in the third embodiment.

Referring to FIGS. 13 and 14, a third embodiment of the present invention will be described. In place of the EGR system of the first and second embodiments wherein the EGR valve and the intake throttle valve are indirectly driven by negative pressure, the EGR system of the third embodiment is constructed so that the EGR valve and the intake throttle valve are directly driven by a stepping motor, etc. with higher responsibility. The fuel supply system will not be described which is similar to that in the first embodiment.

Referring to FIG. 13, the third embodiment is substantially the same as the second embodiment except the following. An EGR valve 120 is provided with a lift sensor 119 and a valve plug 120B directly connected to an actuator 120A such as a stepping motor and having a lift amount or opening degree which is continuously optionally controllable by a drive signal derived from a control unit 113.

Likewise, an intake throttle valve 121 is provided with a lift sensor 122 and a valve plug 121B directly connected to an actuator 121A such as a stepping motor and having a lift amount or opening degree which is continuously optionally controllable by a drive signal derived from the control unit 113.

The lift amount or opening degree of the EGR valve 120 and the intake throttle valve 121 can be obtained from a rotation angle, number of steps, etc. of the stepping motors 120A, 121A without using the lift sensors 119, 122 including, e.g. a gap sensor.

Referring to FIG. 14, EGR control ensured by the control unit 113 will be described. The routine in FIG. 14 is substantially similar to that in FIG. 5 as described in connection with the first embodiment except that a step corresponding to the step 305 in FIG. 5 is eliminated since a response lag of the EGR control can be ignored in view of high control speed of the EGR valve 120 and the intake throttle valve 121.

At a step S328, an engine speed and a load applied to the engine, i.e. fuel injection amount or accelerator opening degree are read.

At a step S329, a target lift amount LIFTa of the EGR valve 120 and a target opening degree T/Ca of the intake throttle valve 121 corresponding to the engine speed and load are obtained by a retrieval from a map at the step S205 as shown in FIG. 12, etc. In order to achieve the continuous EGR amount by combination of the EGR valve 120 and the intake throttle valve 121, the two valves 120, 121 have a characteristic of the opening degree as shown in FIG. 14.

At a step S330, for the target lift amount of the EGR valve 120, the EGR amount and the coolant temperature in the EGR area upon starting, etc. are corrected in the same way as described in connection with the step S206 in FIG. 12. Specifically, the EGR correction amount is obtained from signals indicative of the engine speed and the atmosphere or coolant temperature detected by a temperature sensor, not shown, etc. through a retrieval, etc., which is subtracted from the target lift amount LIFTa to obtain LIFTb. Likewise, as for the intake throttle valve 121, the EGR correction amount is obtained from a retrieval, etc., which is subtracted from the target opening degree T/Ca to obtain T/Cb.

At a step S331, the flow in FIG. 6 is executed to determine whether or not the engine is in transient operation. If the answer is NO, control proceeds to a step S334 where the values LIFTb and T/Cb are output as the target lift amount LIFTc of the EGR valve 120 and the target opening degree T/Cc of the intake throttle valve 121. On the other hand, if the answer is YES, control proceeds to a step S332.

At the step S332, the flow in FIG. 8 is executed to carry out EGR correction with respect to a lag of fuel injection timing control. It is noted that control at the step S332 only needs to be executed in replacing EGRc2 in FIG. 8 with LIFTc2 or T/Cc2.

At a step S333, the value LIFTc2 is output as the target lift amount LIFTc of the EGR valve 120. Likewise, as for the intake throttle valve 121, the value T/Cc2 is output as the target opening degree T/Cc of the intake throttle valve 121.

At a step S335, an actual lift amount LIFTi of the EGR valve 120 detected by the lift sensor 119 is read and compared with the target value LIFTc, which is computed through PID control, etc. so that the actual lift amount LIFTi corresponds to the target value LIFTc, outputting a command or drive signal to the stepping motor 120A. Likewise, as for the intake throttle valve 121, an actual opening degree or lift amount T/Ci detected by the lift sensor 122 is read and compared with the target value T/Cc, which is computed through PID control, etc. so that the actual opening degree T/Ci corresponds to the target value T/Cc, outputting a command or drive signal to the stepping motor 121A.

In such a way, the third embodiment not only produces the same effect as that of the first and second embodiments, but enables more accurate and finer EGR control than that in the first and second embodiments since the responsibility of EGR control is too quick to affect the exhaust performance, resulting in a further reduction in the harmful exhaust components. Moreover, the third embodiment has the advantage that control logic can partly be eliminated.

Figure 15:
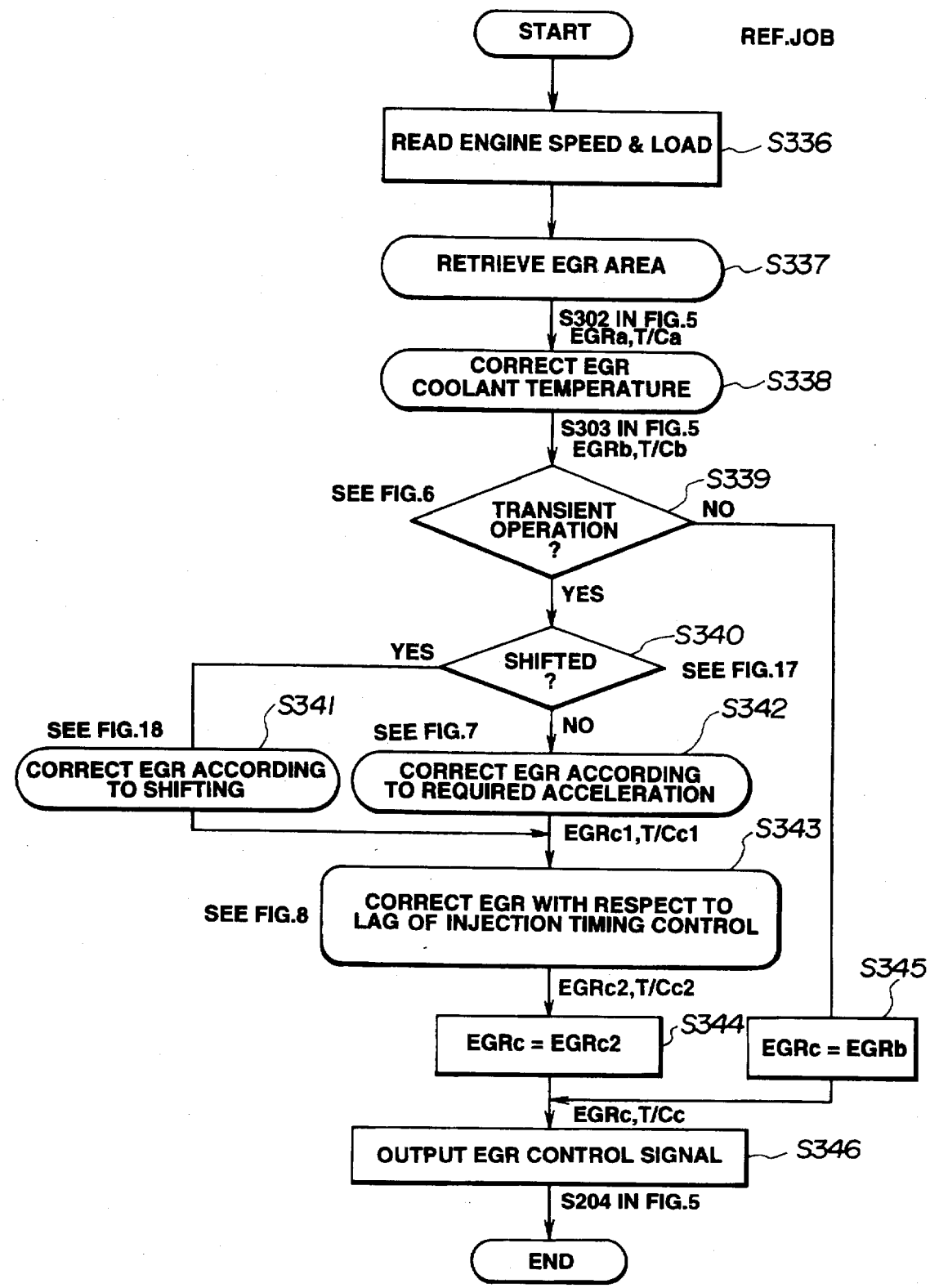
FIG. 15 is a view similar to FIG. 14, showing EGR control in a fourth preferred embodiment.
Figure 16:
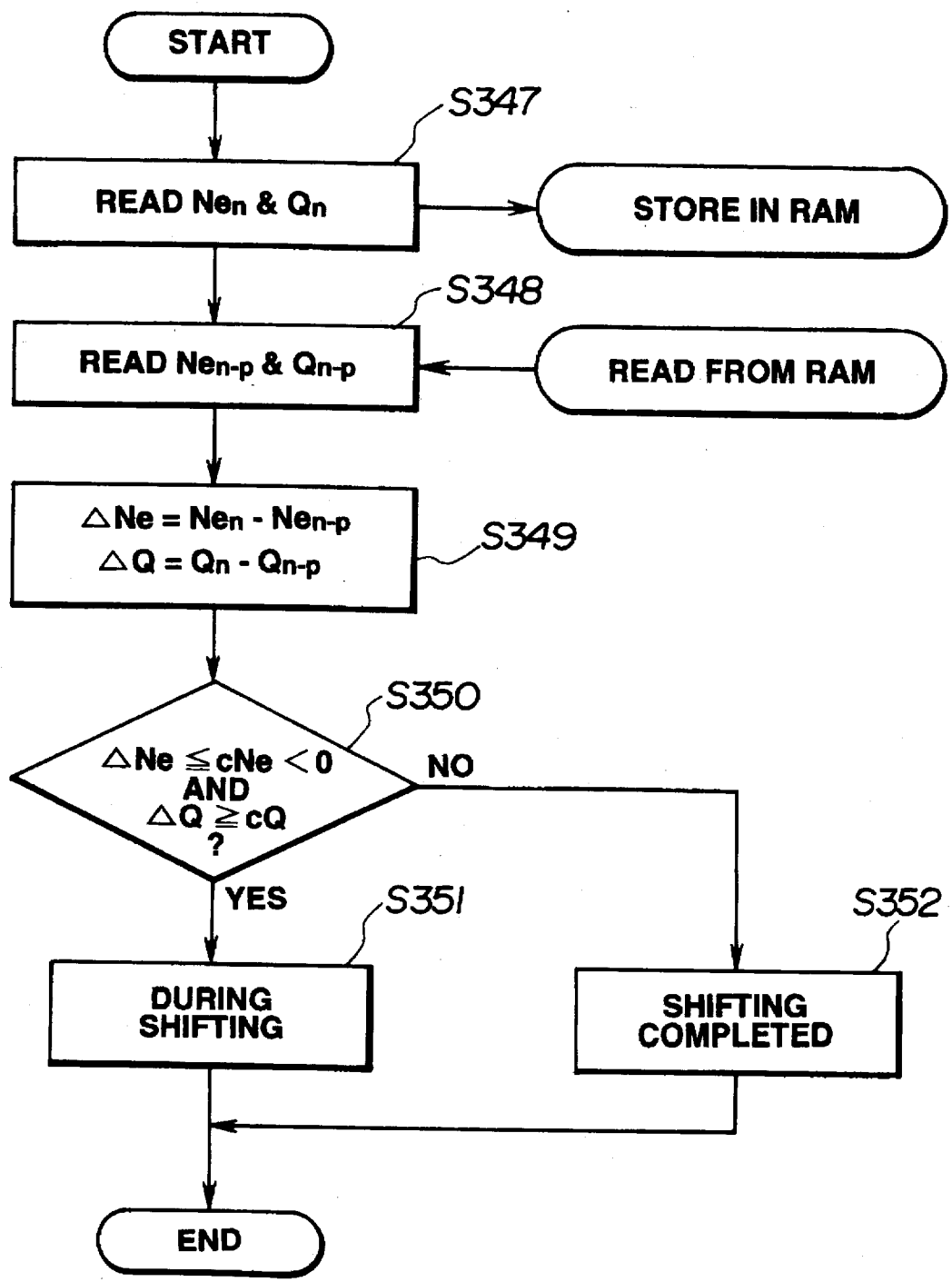
FIG. 16 is a view similar to FIG. 15, showing a routine for shift determination in the fourth embodiment.
Figure 17:
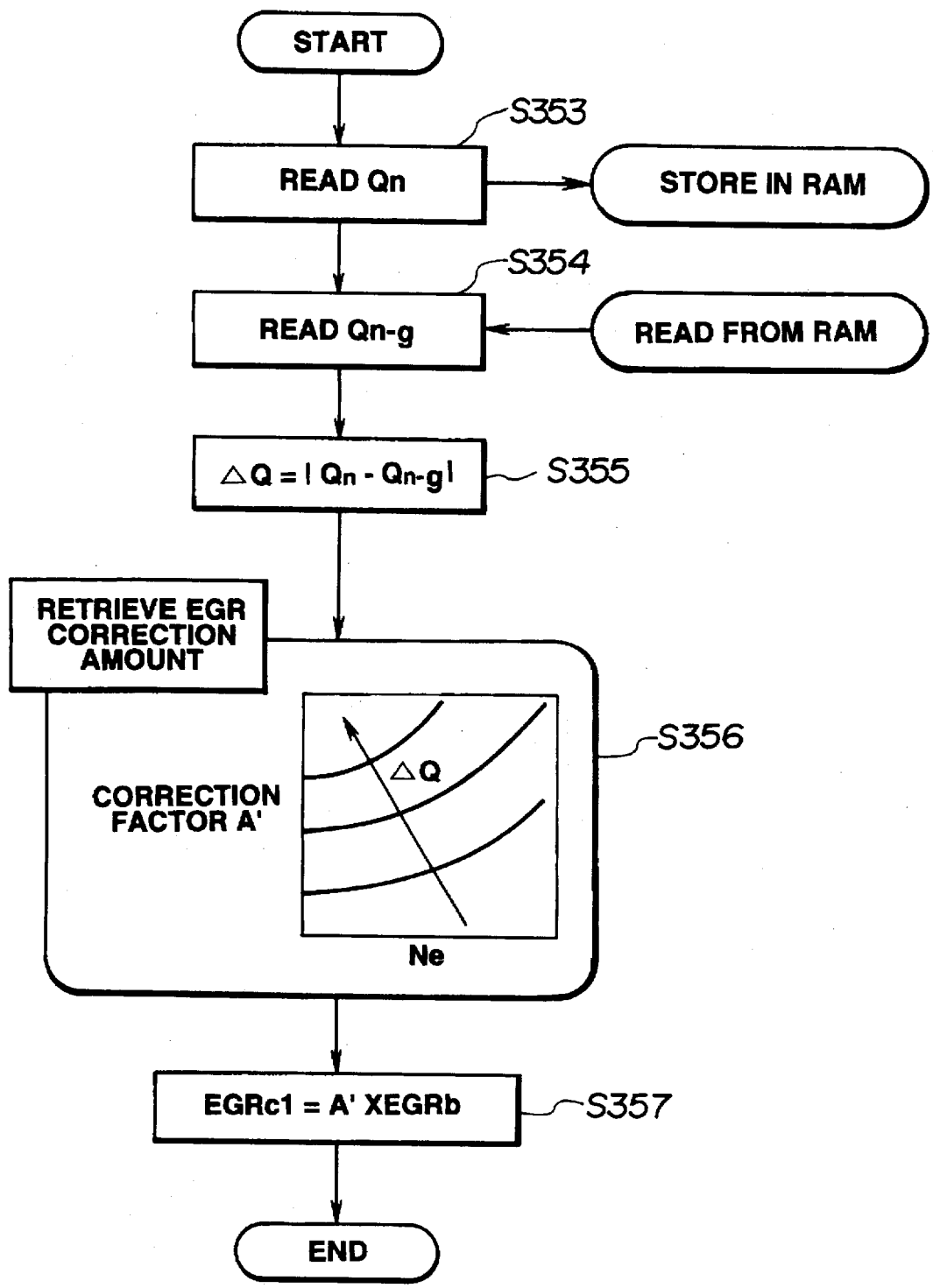
FIG. 17 is a view similar to FIG. 17, showing EGR correction control in accordance with shifting in the fourth embodiment.

Referring to FIGS. 15-17, a fourth embodiment of the present invention will be described. The fourth embodiment concerns optimization of the EGR correction amount in accordance with shifting by detecting a shift up where a sudden load increase appears. FIG. 15 shows a main routine for EGR control, and FIG. 16 shows a routine for shift determination, and FIG. 17 shows a routine for EGR correction in accordance with shifting.

The overall structure of the fourth embodiment may be equivalent to any of the overall structures of the first to third embodiments. Assuming now that the overall structure of the fourth embodiment is equivalent to that of the first embodiment.

Referring to FIG. 15, a routine for EGR control ensured by a control unit 113 will be described. This routine is a variant of the routine in FIG. 5 as described in connection with the first embodiment.

At a step S336, an engine speed and a load, i.e. fuel injection amount or accelerator opening degree are read.

At a step S337, an target EGR area EGRa corresponding to the engine speed and load is retrieved in the same way as described in connection with the step S302 in FIG. 5.

At a step S338, in the same way as described in connection with the step S303 in FIG. 5, the target EGR area EGRa is corrected by the coolant temperature and the engine speed, obtaining a target EGR area EGRb. As for this correction, in view of unstable combustion at low coolant temperature when applying the same EGR at high coolant temperature, the EGR amount is decreased as the atmosphere or coolant temperature is low.

At a step S339, it is determined whether or not the engine is in transient operation according to the same method as that in the first embodiment (see FIG. 6). If the answer is YES, control proceeds to a step S340, whereas, if the answer is NO, control proceeds to a step S345.

At the step S340, it is determined whether or not shifting has been carried out. If the answer is YES, control proceeds to a step S341, whereas, if the answer is NO, control proceeds to a step S342. Details of the step S340 will be given later in connection with FIG. 16.

At the step S341, a corrected target EGR area EGRc1 is calculated in accordance with the subroutine in FIG. 17. Details of the subroutine in FIG. 17 will be given later.

At the step S342, in the same way as in the first embodiment, the EGR area is corrected in accordance with driver's required acceleration (see FIG. 7).

At a step S343, in the same way as in the first embodiment, a lag of fuel injection timing control is predicted to correct the EGR area (see FIG. 8).

At a step S344, a target EGR area EGRc2 obtained by carrying out transient-operation correction of the EGR area serves as a final target EGR area EGRc.

At a step S345, since the engine is in steady operation, the target EGR area EGRb serves as the final target EGR area EGRc.

At a step S346, the target EGR area EGRc is converted into control signals to EGR control parts or solenoid valves 107-110 corresponding to the EGR area, which are then output to the EGR control parts.

Referring to FIG. 16, a description will be made with regard to the routine for shift determination carried out at the step S340. This routine corresponds to shifting detecting means in the present invention.

At a step S347, an actual engine speed $Ne_n$ and a fuel injection amount $Q_n$ are read and stored in RAM.

At a step S348, an engine speed $Ne_{n-p}$ and a fuel injection amount $Q_{n-p}$ stored p times before are read from RAM. p is a matching constant determined, e.g. experimentally, in accordance with the performance of CPU and the accuracy of transient determination.

At a step S349, a variation $\Delta Ne$ in the engine speed and a variation $\Delta Q$ in the fuel injection amount between the respective actual values and values of p times before are calculated.

At a step S350, it is determined whether or not shifting is being carried out. It is determined that shifting is being carried out when the variation $\Delta Ne$ is negative and smaller than a predetermined value cNe, and the variation $\Delta Q$ is greater than a predetermined value cQ, and control proceeds to a step S351. If not, control proceeds to a step S352.

At the step S351, a shift flag is turned on.

At the step S352, the shift flag is turned off.

In such a way, at the step S340, it is determined whether or not shifting is being carried out.

Referring to FIG. 17, a description will be made with regard to the routine for calculating the EGR correction amount in accordance with shifting carried out at the step S341. This routine corresponds to second lag predicting means and third target EGR rate correcting means in the present invention.

This routine is substantially the same as the routine at the step 305 in FIG. 5 or the routine in FIG. 7 except only a step S356.

At the step S356, a correction factor A' is obtained from a map as shown in FIG. 17. Since a load variation is great during shifting, and a combustion is apt to be more unstable during shifting than in steady operation, the target EGR amount needs to be smaller than the optimum EGR amount obtained in steady operation. For that purpose, the correction factor A' has a characteristic as shown in a map in FIG. 17. It is noted that the target EGR amount may be obtained by multiplying the value calculated in FIG. 7, i.e. EGRc1 or A by a shift coefficient S (0<S<1). The step S356 corresponds to the third target EGR rate correcting means in the present invention.

As described above, the fourth embodiment not only produces the same effect as in the first to third embodiments, but enables, combined with correction of the fuel injection timing, sure restraint of a reduction in the excess air ratio during shifting since EGR correction during shifting where a sudden load variation appears can be carried out more appropriately than in the first to third embodiments, resulting in a further reduction in discharged harmful exhaust components and an improvement of the operation performance of the engine.

In the above embodiments, the intake throttle valve is used, which can be eliminated, however. Specifically, the intake throttle valve, which serves ordinarily to increase intake negative pressure so as to achieve a desired EGR rate, can be eliminated if a desired EGR rate is obtained only by control of the opening degree of the EGR valve without the intake throttle valve.

Further, in the above embodiments, the fuel injection pump is of the distributor type provided with one plunger, alternatively, it may be of the in-line type in which each cylinder is provided with a plunger. Moreover, the diesel engine may be any of the direct injection type and the auxiliary chamber type.

Furthermore, in the above embodiments, the fuel injection pump is of the electronically controlled type, alternatively, it may be of the mechanically controlled type. Specifically, in view of the concept that, when the operating conditions, i.e. required fuel injection amount and fuel injection timing are varied, a lag of the required fuel injection timing is predicted, in accordance with which EGR control is corrected, the structure that EGR control is corrected according to a characteristic of a lag of fuel injection timing control previously determined, e.g. experimentally, in accordance with a variation in the operation conditions can produce the same effect as that of the present invention. With the mechanically controlled fuel injection pump, if the sensors is arranged to detect an actual fuel injection amount and fuel injection timing as described in the above embodiments so that the EGR amount is corrected in accordance with a difference between the detected values and the target values, EGR control can be corrected with manufacturing dispersion, etc. of the diesel engines removed with respect to the case that a characteristic of a lag of fuel injection timing control is previously determined without using the sensors, resulting in further improved accuracy of EGR control.

What is claimed is:

1. A controller for an internal combustion engine, the engine being provided with an exhaust gas recirculation (EGR) passage for ensuring communication of an intake passage with an exhaust passage, the controller comprising:

an EGR valve arranged in the EGR passage, said EGR valve serving to control an EGR rate;

means for controlling said EGR valve to obtain a target EGR rate;

means for controlling a fuel injection timing in accordance with operating conditions of the engine;

means for detecting a variation in said operating conditions of the engine;

first means for predicting a lag of said fuel injection timing controlled in accordance with said variation in said operating conditions of the engine detected; and first means for correcting said target EGR rate in accordance with said lag of said fuel injection timing predicted.

2. A controller as claimed in claim 1, further comprising:

second means for correcting said target EGR rate in accordance with said variation in said operating conditions of the engine detected.

3. A controller as claimed in claim 2, further comprising:

an intake throttle valve arranged in the intake passage, said EGR valve controlling means serving to control said intake throttle valve to obtain said target EGR rate.

4. A controller as claimed in claim 3, wherein said target EGR rate is controlled stepwise.

5. A controller as claimed in claim 4, wherein said target EGR rate is controlled continuously.

6. A controller as claimed in claim 3, further comprising:

means for detecting a shifting;

second means for predicting said lag of said fuel injection timing controlled in accordance with a variation in a load during said shifting when said shifting is detected; and third means for correcting said target EGR rate in accordance with said lag of said fuel injection timing predicted.

7. In an internal combustion engine provided with intake and exhaust passages:

means for defining an exhaust gas recirculation (EGR) passage, said EGR passage defining means serving to ensure communication of the intake passage with the exhaust passage;

an EGR valve arranged in said EGR passage defining means, said EGR valve serving to control an EGR rate;

means for controlling said EGR valve to obtain a target EGR rate;

means for controlling a fuel injection timing in accordance with operating conditions of the engine;

means for detecting a variation in said operating conditions of the engine;

first means for predicting a lag of said fuel injection timing controlled in accordance with said variation in said operating conditions of the engine detected; and first means for correcting said target EGR rate in accordance with said lag of said fuel injection timing predicted.

8. An internal combustion engine as claimed in claim 7, further comprising:

second means for correcting said target EGR rate in accordance with said variation in said operating conditions of the engine detected.

9. An internal combustion engine as claimed in claim 8, further comprising:

an intake throttle valve arranged in the intake passage, said EGR valve controlling means serving to control said intake throttle valve to obtain said target EGR rate.

10. An internal combustion engine as claimed in claim 9, wherein said target EGR rate is controlled stepwise.

11. An internal combustion engine as claimed in claim 10, wherein said target EGR rate is controlled continuously.

12. An internal combustion engine as claimed in claim 9, further comprising:

means for detecting a shifting;

second means for predicting said lag of said fuel injection timing controlled in accordance with a variation in a load during said shifting when said shifting is detected; and third means for correcting said target EGR rate in accordance with said lag of said fuel injection timing predicted.

* * * * *